United States Patent
Hamagishi et al.

(10) Patent No.: US 9,606,368 B2
(45) Date of Patent: Mar. 28, 2017

(54) THREE-DIMENSIONAL IMAGE DISPLAY DEVICE

(71) Applicant: Samsung Display Co., Ltd., Yongin (KR)

(72) Inventors: Goro Hamagishi, Hwaseong-si (KR); SeHuhn Hur, Yongin-si (KR); Il-Joo Kim, Hwaseong-si (KR); Kyungho Jung, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 81 days.

(21) Appl. No.: 14/678,599

(22) Filed: Apr. 3, 2015

(65) Prior Publication Data

US 2016/0004088 A1 Jan. 7, 2016

(30) Foreign Application Priority Data

Jul. 2, 2014 (KR) .................. 10-2014-0082569

(51) Int. Cl.
*G02B 27/22* (2006.01)
*H04N 13/04* (2006.01)
*G09G 3/20* (2006.01)

(52) U.S. Cl.
CPC ....... *G02B 27/2214* (2013.01); *G09G 3/2003* (2013.01); *G09G 3/2022* (2013.01); *H04N 13/0404* (2013.01); *H04N 13/0415* (2013.01); *H04N 13/0422* (2013.01); *G09G 2310/0235* (2013.01)

(58) Field of Classification Search
CPC .. G02B 27/2214; G02B 27/225; G02B 27/22; H04N 13/0404; H04N 13/0409; H04N 13/0402; H04N 13/0445; H04N 13/00
USPC ................ 359/462, 463, 464, 466, 467, 477
See application file for complete search history.

(56) References Cited

U.S. PATENT DOCUMENTS

| 6,064,424 | A | 5/2000 | Van Berkel et al. |
| 8,233,036 | B2 | 7/2012 | Park |
| 8,339,705 | B2 * | 12/2012 | Hong ................ G02B 27/2214 348/59 |
| 8,493,439 | B2 | 7/2013 | Park |

(Continued)

FOREIGN PATENT DOCUMENTS

| JP | 2005-258421 | 9/2005 |
| JP | 2005-309374 | 11/2005 |

(Continued)

*Primary Examiner* — Jade R Chwasz
(74) *Attorney, Agent, or Firm* — H.C. Park & Associates, PLC

(57) ABSTRACT

A three-dimensional image display device including a dot displaying viewpoint images and a viewpoint forming unit. The dot displays first and second color images respectively having first and second colors of a first viewpoint image among the viewpoint images during a first sub-frame, and displays a third color image having a third color of the first viewpoint image during a second sub-frame. The viewpoint forming unit includes viewpoint forming devices, which are positioned at a first position during the first sub-frame to project the first and second color images on a viewing zone corresponding to the first viewpoint image, and positioned at a second position during the second sub-frame to project the third color image on the viewing zone.

29 Claims, 20 Drawing Sheets

(56) References Cited

U.S. PATENT DOCUMENTS

| | | | |
|---|---|---|---|
| 2004/0252374 A1* | 12/2004 | Saishu | G02B 27/2214 359/462 |
| 2012/0182611 A1 | 7/2012 | Fukushima et al. | |
| 2012/0327079 A1* | 12/2012 | Park | H04N 13/0497 345/419 |
| 2013/0050815 A1 | 2/2013 | Fukushima et al. | |
| 2013/0057159 A1 | 3/2013 | Pijlman et al. | |
| 2013/0107174 A1 | 5/2013 | Yun et al. | |
| 2014/0340402 A1 | 11/2014 | Hamagishi et al. | |

FOREIGN PATENT DOCUMENTS

| | | |
|---|---|---|
| JP | 2009-519497 | 5/2009 |
| KR | 10-2012-0031400 | 4/2012 |
| KR | 10-2013-0013959 | 2/2013 |

* cited by examiner

<SF1>

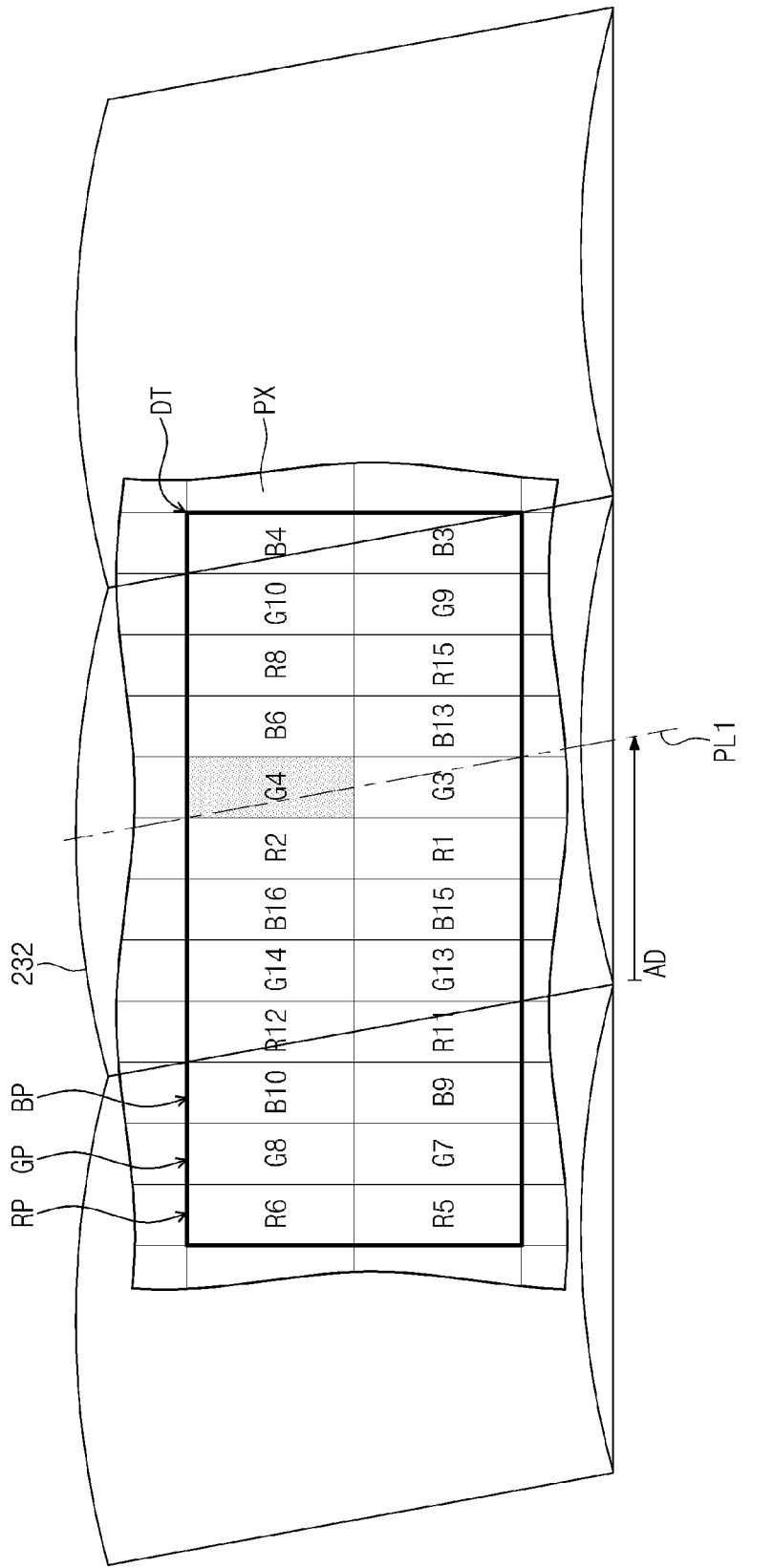

<SF2>

<SF1>

<SF1>

<SF2>

THREE-DIMENSIONAL IMAGE DISPLAY DEVICE

CROSS-REFERENCE TO RELATED APPLICATION

This U.S. non-provisional patent application claims priority from and the benefit of Korean Patent Application No. 10-2014-0082569, filed on Jul. 2, 2014, which is hereby incorporated by reference for all purposes as if fully set forth herein.

BACKGROUND

Field

Exemplary embodiments relate to a display device. More particularly, exemplary embodiments relate to a three-dimensional image display device capable of displaying an image using an auto-stereoscopic method.

Discussion of the Background

Auto-stereoscopic display technology applied to a three-dimensional image display device displays a three-dimensional image without a need for shutter glasses. A parallax barrier scheme and a lenticular lens scheme are widely used as examples of auto-stereoscopic display technology.

A three-dimensional image display device employing the parallax barrier scheme includes a parallax barrier, through which vertical lattice-shape openings are formed, disposed in front of a display panel including pixels arranged in rows by columns. The parallax barrier separates a right-eye image and a left-eye image and respectively provides the right- and left-eye images to right and left eyes of an observer. Accordingly, the observer recognizes the three-dimensional image due to a binocular disparity in different images between the right- and left-eye images.

A three-dimensional image display device employing the lenticular lens scheme includes a lenticular lens sheet having a plurality of semi-cylindrical lenses arranged in a column direction and disposed on the display panel, instead of the parallax barrier having the vertical lattice shape.

In particular, a lenticular device, which is switchable between a two-dimensional mode and a three-dimensional mode, includes two substrates and a liquid crystal layer disposed between the two substrates. One of the two substrates includes electrodes configured to arrange liquid crystal molecules of the liquid crystal layer in the lenticular lens form. The lenticular device is disposed in front of a display panel and is switchable between the two-dimensional mode and the three-dimensional mode by turning on or off a voltage applied to the electrodes.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a three-dimensional image display device having a high resolution.

Additional aspects will be set forth in the detailed description which follows, and, in part, will be apparent from the disclosure, or may be learned by practice of the inventive concept.

An exemplary embodiment of the inventive concept discloses a three-dimensional image display device including a display panel and a viewpoint forming unit. The display panel includes a dot including a plurality of pixels, the dot displaying first and second color images respectively having first and second colors of a first viewpoint image among a plurality of viewpoint images during a first sub-frame, and displaying a third color image having a third color of the first viewpoint image during a second sub-frame. The viewpoint forming unit includes a plurality of viewpoint forming devices, each having a pitch less than a width in a row direction of the dot, being positioned at a first position during the first sub-frame to project the first and second color images on a viewing zone corresponding to the first viewpoint image, and being positioned at a second position during the second sub-frame to project the third color image on the viewing zone.

An exemplary embodiment of the inventive concept also discloses a three-dimensional image display device including a display panel and a viewpoint forming unit. The display panel includes a dot configured to include M×N pixels arranged in M rows by N columns. The dot displays first, second, and third color images respectively having first, second, and third colors of a first viewpoint image among a plurality of viewpoint images during a first sub-frame, and displays fourth, fifth, and sixth color images respectively having the first, second, and third colors of a second viewpoint image among the viewpoint images during a second sub-frame. The viewpoint forming unit includes a plurality of viewpoint forming devices each having a pitch smaller than a width in a row direction of the dot. The viewpoint forming devices are positioned at a first position during the first sub-frame to project the first, second, and third color images on a first viewing zone corresponding to the first viewpoint image, and positioned at a second position during the second sub-frame to project the fourth, fifth, and sixth color images on a second viewing zone corresponding to the second viewpoint image.

According to the above, the three-dimensional image display device displays the 3D images having colors during the first and second sub-frames, and thus the number of viewpoints of the 3D images can be increased. In addition, since one dot includes the pixels arranged in the matrix form, a resolution in the row direction and a resolution in the column direction may be prevented from becoming non-uniformly deteriorated.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 7A and FIG. 7B are views showing a display panel and a viewpoint forming device in first and second sub-frames according to another exemplary embodiment of the present disclosure.

DETAILED DESCRIPTION OF THE ILLUSTRATED EMBODIMENTS

Figure 1:
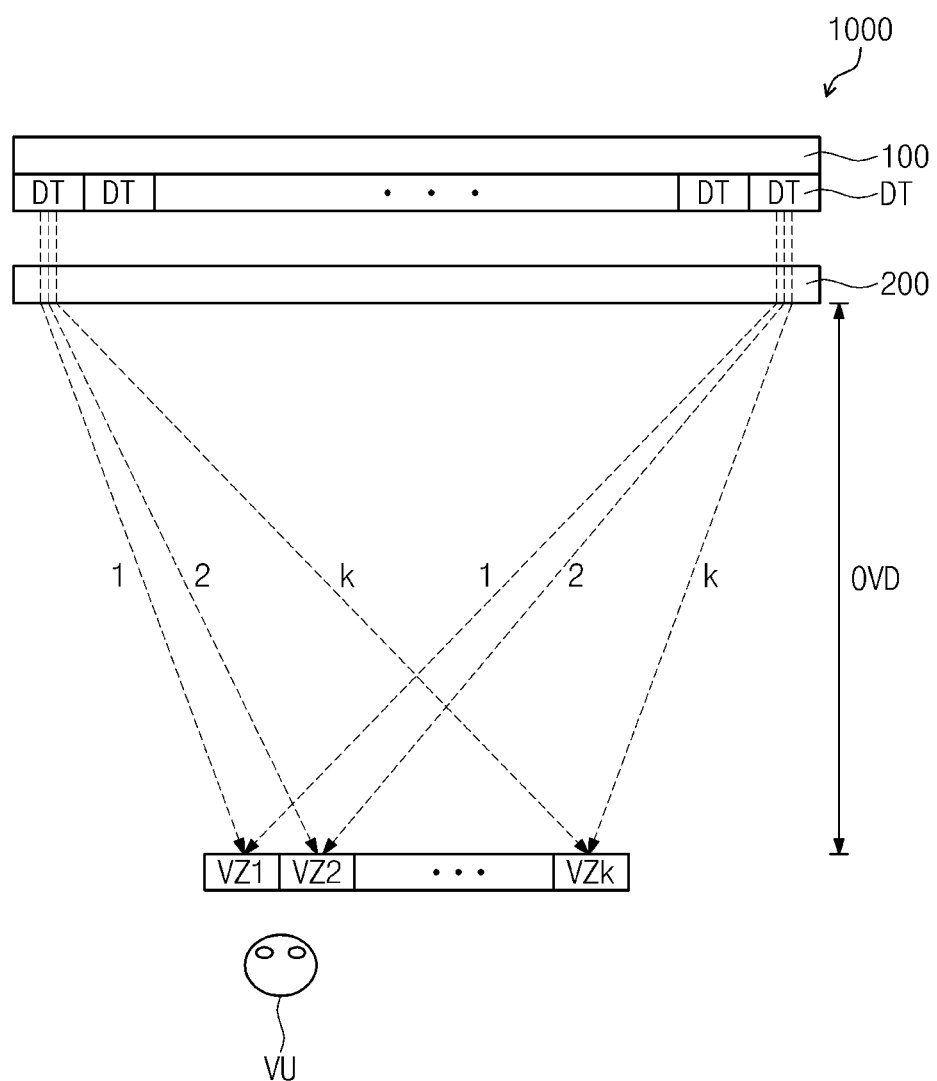
FIG. 1 is a view showing a three-dimensional image display device displaying a three-dimensional image according to an exemplary embodiment of the present disclosure.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a view showing a three-dimensional (3D) image display device 1000 displaying a 3D image according to an exemplary embodiment of the present disclosure.

Referring to FIG. 1, the 3D image display device 1000 includes a display panel 100 configured to display a two-dimensional (2D) image and a viewpoint forming unit 200 facing the display panel 100. The viewpoint forming unit 200 converts the 2D image to the 3D image.

The display panel 100 includes a plurality of dots DT. The dots DT are arranged in a row direction and a column direction, e.g., a matrix form. Each dot DT displays a plurality of viewpoint images. As an example, the viewpoint images are configured to include first to k-th viewpoint images 1 to k. There may be a various number of the viewpoint images kn. For example, the number of the viewpoint images kn may be 8, 12, or 16.

The viewpoint forming unit 200 refracts the first to k-th viewpoint images 1 to k at different angles when viewed in a plan view to project the first to k-th viewpoint images 1 to k on first to k-th viewing zones VZ1 to VZk, which are defined at a visible distance OVD. The first to k-th viewing zones VZ1 to VZk are sequentially arranged in the row direction.

Accordingly, the first to k-th viewpoint images 1 to k respectively form a plurality of viewpoints. In this case, the number of the viewpoints may be substantially the same as that of the viewpoint images kn and the first to k-th viewpoint images 1 to k of the dots DT respectively form the first to k-th viewpoints.

In more detail, the first viewpoint is configured to include the first viewpoint images 1 of the dots DT projected on the first viewing zone VZ1. Similarly, the second to k-th viewpoints are configured to include the second to k-th viewpoint images 2 to k projected on the second to k-th viewing zones VZ2 to VZk.

As shown in FIG. 1, a viewer VU recognizes the image displayed on the display panel 100 through the viewpoint forming unit 200 disposed between the display panel 100 and the viewer VU. A left eye of the viewer VU recognizes the first viewpoint in the first viewing zone VZ1, and a right eye of the viewer VU recognizes the second viewpoint in the second viewing zone VZ2. Therefore, the viewer VU recognizes the first and second viewpoints, which are different from each other, through the left and right eyes, and thus, the viewer VU recognizes the 3D image according to binocular disparity between the left and right eyes.

When the viewer VU moves along the row direction, the viewer VU sequentially recognizes the different viewpoints through the left and right eyes. As a result, the viewer VU recognizes different 3D images while moving along the row direction.

Meanwhile, the 3D image display device 1000 may display the first to k-th viewpoint images 1 to k during a plurality of sub-frames obtained by dividing one frame in time.

Figure 2:
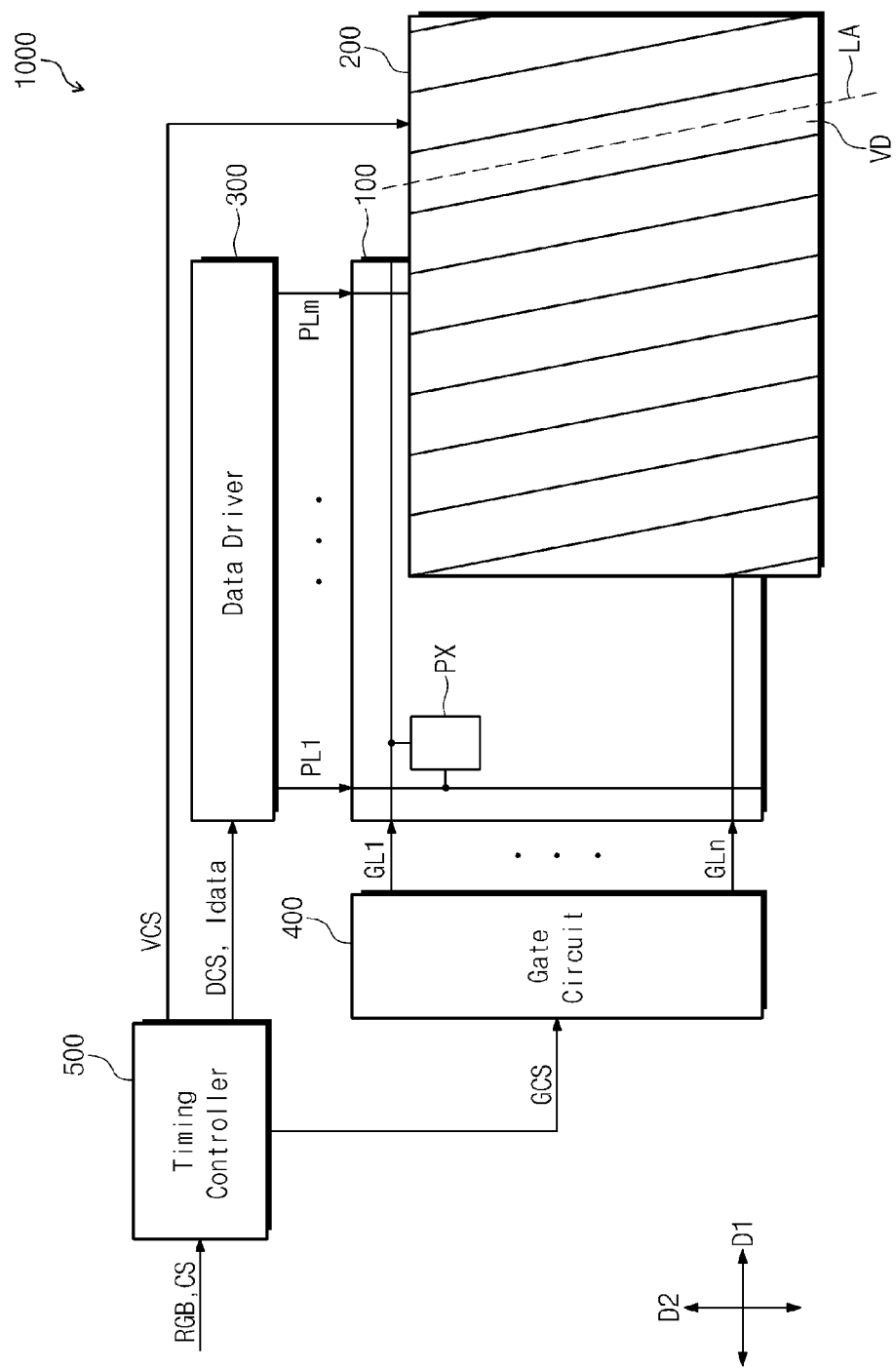
FIG. 2 is a block diagram showing a three-dimensional image display device according to an exemplary embodiment of the present disclosure.

FIG. 2 is a block diagram showing the 3D image display device according to an exemplary embodiment of the present disclosure.

Referring to FIG. 2, the 3D image display device 1000 includes data driver 300 and gate driver 400 to drive the display panel 100, and a timing controller 500 to control the drive of the data driver 300 and the gate driver 300400.

The timing controller 500 receives image information RGB and control signals CS from the outside of the 3D image display device 1000. The timing controller 500 converts a data format of the image information RGB to a data format appropriate to an interface between the data driver 300 and the timing controller 500, and generates image data Idata. The timing controller 500 applies the image data Idata to the data driver 300. The timing controller 500 generates a data control signal DCS, e.g., an output start signal, a horizontal start signal, etc., and a gate control signal GCS, e.g., a vertical start signal, a vertical clock signal, a vertical clock bar signal, etc., on the basis of the control signals CS. The data control signal DCS is applied to the data driver 300 and the gate control signal GCS is applied to the gate driver 400.

The gate driver 400 sequentially outputs gate signals in response to the gate control signal GCS provided from the timing controller 500.

The data driver 300 converts the image data Idata to data voltages in response to the data control signal DCS provided from the timing controller 500. The data voltages are applied to the display panel 100.

The display panel 100 includes a plurality of gate lines GL1 to GLn, a plurality of data lines DL1 to DLm, and a plurality of pixels PX. FIG. 2 shows only one pixel PX as a representative example.

The gate lines GL1 to GLn extend in a first direction D1 and are arranged in a second direction D2 different from the first direction D1 to be substantially in parallel with each other. The first direction D1 is substantially perpendicular to the second direction D2. The gate lines GL1 to GLn are connected to the gate driver 400 and receive the gate signals from the gate driver 400. Here, the first and second directions D1 and D2 are respectively substantially in parallel with the row and column directions.

The data lines DL1 to DLm extend in the second direction D2 and are arranged in the first direction D1 to be substantially in parallel with each other. The data lines DL1 to DLm are connected to the data driver 300 and receive the data voltages from the data driver 300.

Each pixel PX includes a thin film transistor (not shown) and a liquid crystal capacitor (not shown), and is connected to a corresponding gate line of the gate lines GL1 to GLn and a corresponding data line of the data lines DL1 to DLm. In more detail, each pixel PX is turned on or off in response to the gate signal applied thereto. The turned-on pixels PX display gray-scale values corresponding to the data voltages.

When viewed in a plan view, the viewpoint forming unit 200 has a long axis LA inclined with respect to the column direction and includes a plurality of viewpoint forming devices VD arranged in the row direction. The viewpoint forming devices VD may include a plurality of lenticular lenses or a parallax barrier.

The viewpoint forming unit 200 may be provided in an optical sheet with either the lenticular lens or the parallax barrier, or in a switching panel that switches the 3D image display device 1000 to the 2D or 3D mode. Hereinafter, the viewpoint forming unit 200 provided in the switching panel will be described in detail.

The timing controller 500 applies a viewpoint control signal VCS to the viewpoint forming unit 200. The viewpoint forming unit 200 is operated in response to the viewpoint control signal VCS.

In the present exemplary embodiment, the operation mode of the 3D image display device 1000 is switchable to the 2D mode from the 3D mode, or vice versa, by the viewpoint forming unit 200. In detail, when the viewpoint forming unit 200 is turned on, the 2D image output from the display panel 100 is converted to the 3D image, and the viewer VU recognizes the 3D image. In this case, the 3D image display device 1000 is operated in the 3D mode.

Meanwhile, when the viewpoint forming unit 200 is turned off, the 2D image output from the display panel 100 transmits through the viewpoint forming unit 200, and the viewer VU recognizes the 2D image. In this case, the 3D image display device 1000 is operated in the 2D mode. Hereinafter, the display panel 100 operated in the 3D mode will be described in detail.

As the display panel 100, various types of display panels, e.g., a liquid crystal display panel, an organic light emitting display panel, an electrophoretic display panel, an electrowetting display panel, etc., may be used.

When the liquid crystal display panel is used as the display panel 100, the 3D image display device 1000 includes a backlight unit (not shown) disposed at a rear side of the display panel 100. The backlight unit supplies a white light to the liquid crystal display panel. In addition, the 3D image display device 1000 may include a pair of polarizers respectively disposed on upper and lower surfaces of the liquid crystal display panel. The polarizers have transmission axes perpendicular to each other.

Figure 3:
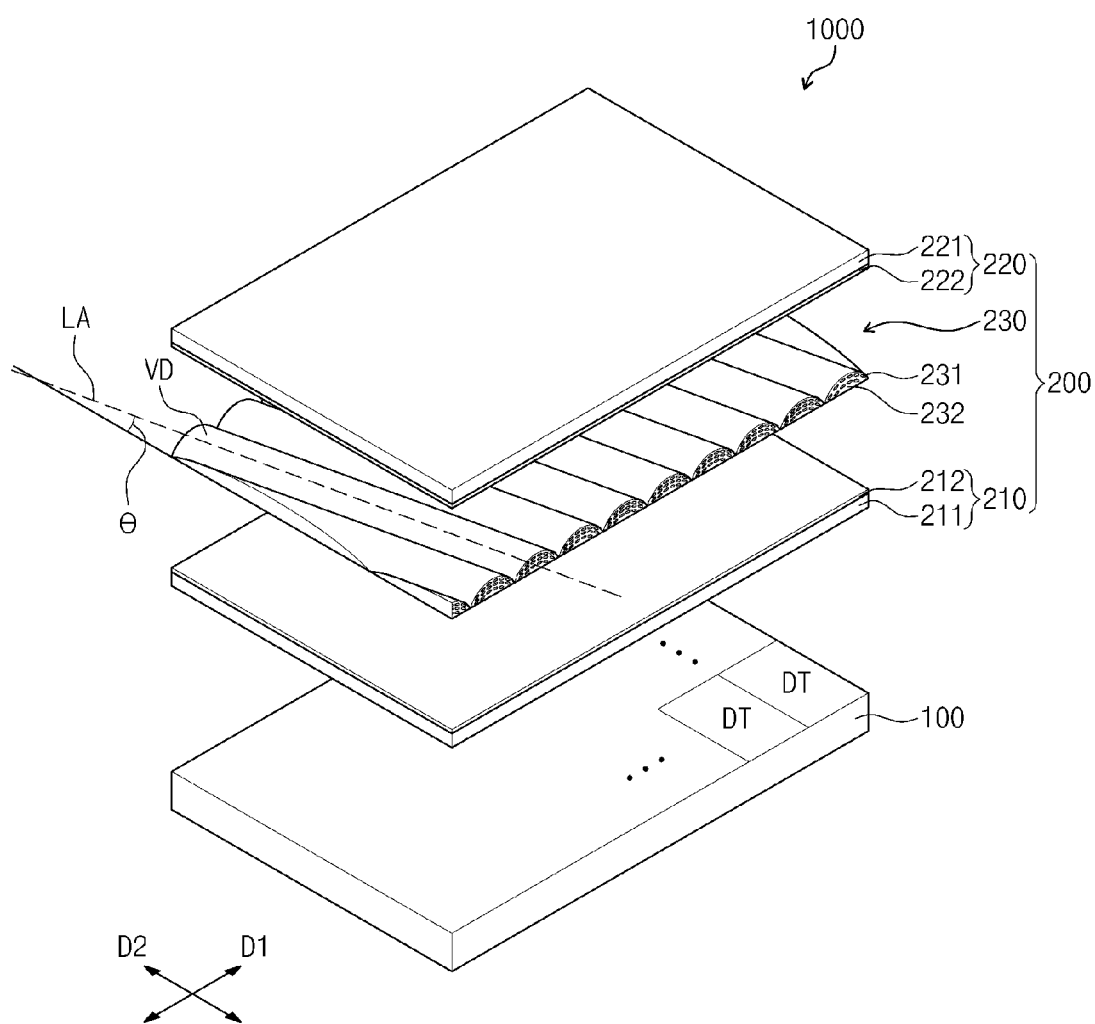
FIG. 3 is an exploded perspective view showing the three-dimensional image display device shown in FIG. 2.

FIG. 3 is an exploded perspective view showing the 3D image display device 1000 shown in FIG. 2.

Referring to FIG. 3, the viewpoint forming unit 200 includes a first substrate 210, a second substrate 220, and a liquid crystal layer 230 interposed between the first and second substrates 210 and 220. The first substrate 210 includes a first base substrate 211 and a first electrode layer 212 disposed on the first base substrate 211, and the second substrate 220 includes a second base substrate 221 and a second electrode layer 222 disposed on the second base substrate 221. The first and second electrode layers 212 and 222 include a transparent conductive material, e.g., indium tin oxide, indium zinc oxide, etc. The first electrode layer 211 may be patterned, and the second electrode layer 222 may be integrally formed as a single unitary and individual unit.

The liquid crystal layer 230 includes liquid crystal molecules 231. An electric field is formed in the liquid crystal layer 230 by voltages respectively applied to the first and second electrode layers 212 and 222, and thus, alignment of the liquid crystal molecules of the liquid crystal layer 230 may be controlled. The voltages respectively applied to the first and second electrode layers 212 and 222 are controlled by the viewpoint control signal VCS (refer to FIG. 1). The viewpoint forming unit 200 forms the viewpoint forming devices VD (refer to FIG. 1) in response to the viewpoint control signal VCS. In the present exemplary embodiment, the viewpoint forming devices VD may be realized by a plurality of lenticular lenses 232, but they should not be limited thereto. That is, the viewpoint forming devices VD may also be realized by the parallax barrier that forms a light blocking area and a light transmitting area.

Figure 4:
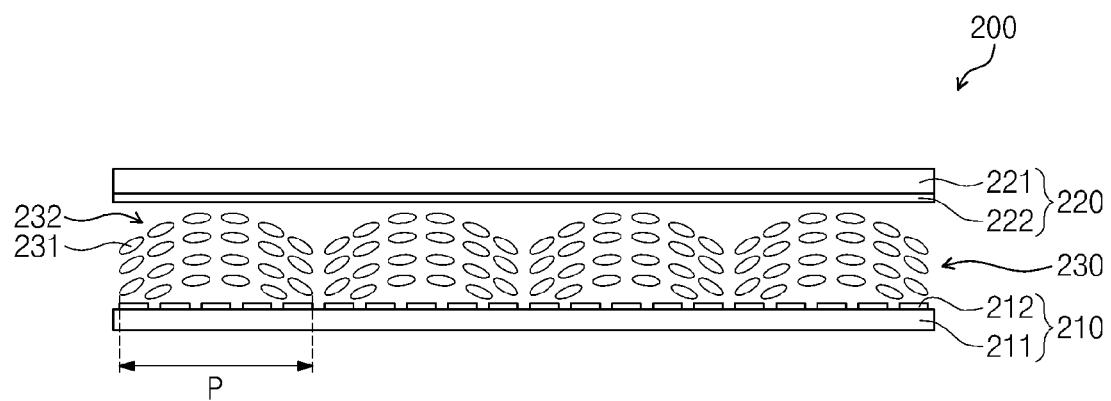
FIG. 4 is a cross-sectional view showing a viewpoint forming unit shown in FIG. 3.

FIG. 4 is a cross-sectional view showing the viewpoint forming unit 200 shown in FIG. 3.

Referring to FIGS. 3 and 4, when the viewpoint forming unit 200 is operated in the 3D mode, the liquid crystal molecules 231 included in the liquid crystal layer 230 are aligned in a semi-cylindrical shape to form the lenticular lenses 232. The lenticular lenses 232 are arranged in the first direction D1 and extend in a direction inclined at an angle θ with respect to the second direction D2. In this case, a long axis LA inclined at the angle θ is defined in the lenticular lenses 232. When the electric field applied to the liquid crystal layer 230 is controlled, a position of the lenticular lenses 232, a pitch P in the row direction of the lenticular lenses 232, and a slope of the long axis LA may be determined.

To form the lenticular lenses 232 extending in the direction inclined at the angle θ, the first electrode layer 212 may have a stripe pattern extending in the direction inclined at the angle θ.

Figure 5:
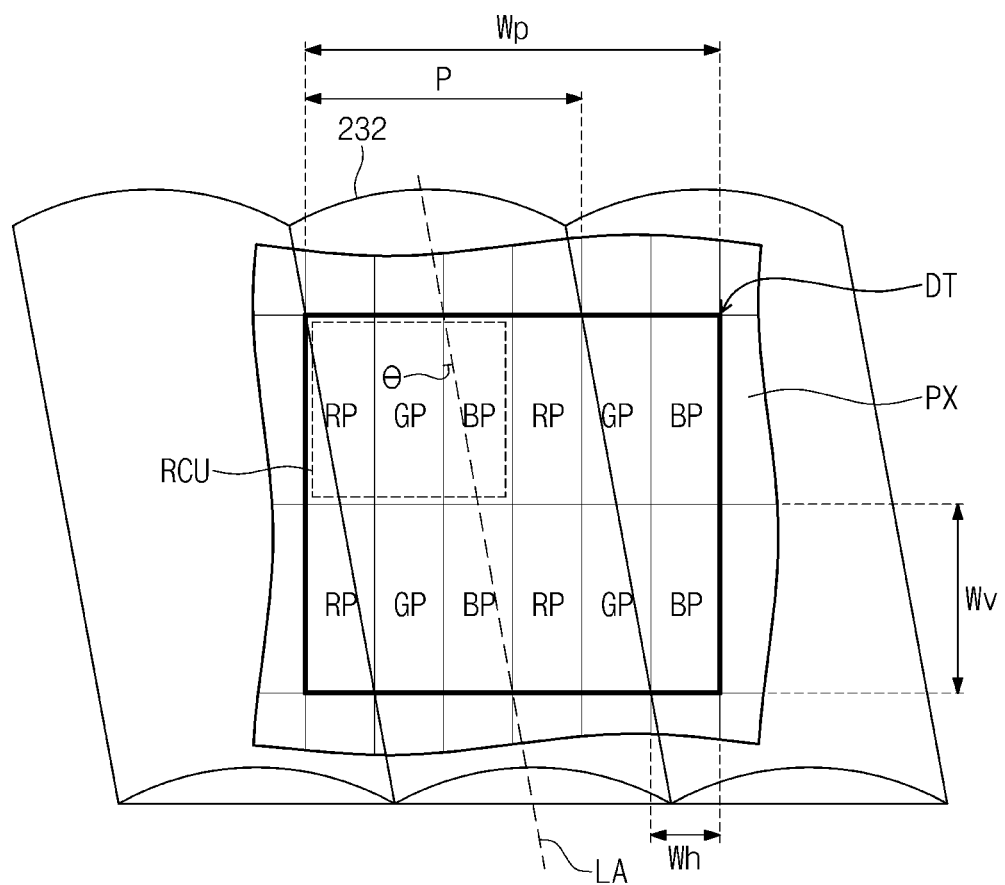
FIG. 5 is a plan view showing a display panel and a viewpoint forming device shown in FIG. 3.

FIG. 5 is a plan view showing the display panel and the viewpoint forming device shown in FIG. 3.

FIG. 5 shows one dot DT among the dots DT shown in FIG. 3 and the pixels PX disposed in the vicinity of the one dot DT as a representative example since the dots DT have the same structure and function.

The dot DT includes M×N pixels PX arranged in M rows by N columns. As an example, the N of the dot DT is 6 and the M of the dot DT is 2, but they should not be limited thereto or thereby. Each pixel PX has a rectangular shape having a width Wh in the row direction and a width Wv in the column direction.

As described above, the dot DT displays the first to k-th viewpoint images 1 to k (refer to FIG. 1). As an example, the number kn of the viewpoint images is eight, and thus the dot DT displays first to eighth viewpoint images.

Each of the first to eighth viewpoint images is configured to include color images having different colors, and the 3D image display device 1000 (refer to FIG. 1) displays the 3D image having the color using the color images. For instance, the color images are configured to include first, second, and third color images that respectively display different primary colors.

As an example, the first, second, and third color images may be red, green, and blue images to display red, green, and blue colors, respectively. Accordingly, each of the first to eighth viewpoint images includes the red, green, and blue images, but it should not be limited thereto. That is, the first to third color images may display one of magenta, cyan, yellow, and white colors.

The pixels PX included in the dot DT may be red pixels RP displaying the red images of the first to eighth viewpoint images, green pixels GP displaying the green images of the first to eighth viewpoint images, or blue pixels BP displaying the blue images of the first to eighth viewpoint images.

The dot DT includes a row color unit RCU. The row color unit RCU is configured to include the red pixel RP, the green pixel GP, and the blue pixel BP, which are sequentially arranged in the row direction. For example, each row of the dot DT includes two row color units RCU. In this case, since the row color unit RCU includes three pixels RP, GP, and BP, the number N of the columns of the dot DT becomes a multiple of 3.

However, the number of the row color units RCU disposed in each row of the dot DT should not be limited thereto.

For example, the number N of the columns of the dot DT is not a multiple of 9. When the number N of the columns of the dot DT is the multiple of 9, only one color image among the red, green, and blue images is projected in each viewing zone. As a result, the color image may not be realized in each viewing zone.

The pixels PX disposed adjacent to each other in the column direction display the same color image. In more detail, the red pixels PX are disposed in first and fourth columns of the dot DT, the green pixels GP are disposed in second and fifth columns of the dot DT, and the blue pixels BP are disposed in third and sixth columns of the dot DT.

Since the N pixels PX are arranged in the dot DT along the row direction, a width Wp in the row direction of the dot DT is obtained by multiplying the number N of the pixels PX by the width Wh in the row direction of each pixel PX. In the present exemplary embodiment, since the number N of the columns of the dot DT is six, the width Wp of the dot DT is obtained by multiplying the width Wh by 6, i.e., Wh·6.

The pitch P of the lenticular lenses 232 is less than the width Wp of the dot DT. The pitch P of each of the lenticular lenses 232 satisfies the following Equation 1:

$$0 < P \leq 2/3 \cdot Wp = 2/3 \cdot Wh \cdot N \qquad \text{Eq. 1}$$

In the present exemplary embodiment, since the number N of the columns of the dot DT is six, the pitch P is obtained by multiplying the width Wh by 4, i.e., Wh·4. In other words, the pitch P of each of the lenticular lenses 232 corresponds to a sum of the width W in the row direction of four pixels PX.

The pitch P of the lenticular lenses 232 is less than the width Wp in the row direction of the dot DT, and thus, at least two lenticular lenses 232 are required to cover the dot DT.

The angle θ of the long axis LA of each of the lenticular lenses 232 satisfies the following Equation 2:

$$\tan\theta = \frac{b \cdot Wh}{a \cdot Wv} \qquad \text{Eq. 2}$$

In Equation 2, "Wv" denotes the width Wv in the column direction of the pixel PX, and "a" and "b" denote natural numbers. In the present exemplary embodiment, a=2 and b=1.

Figure 6A:
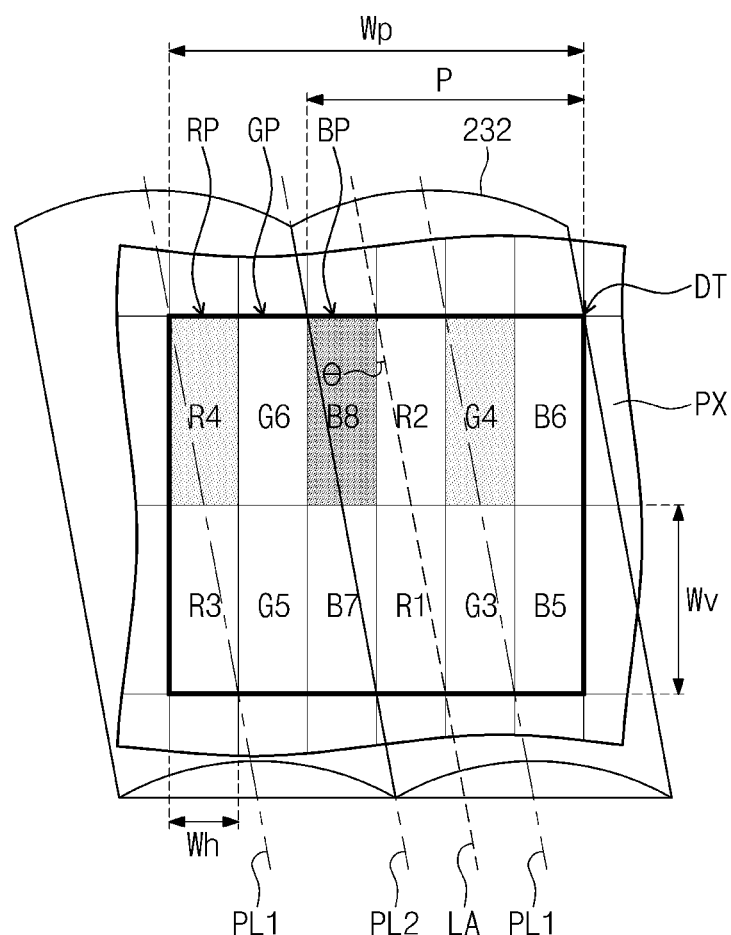
FIG. 6A and FIG. 6B are views showing the display panel and the viewpoint forming device shown in FIG. 5 in first and second sub-frames according to an exemplary embodiment of the present disclosure.
Figure 6A:
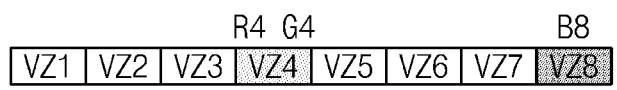
Figure 6B:
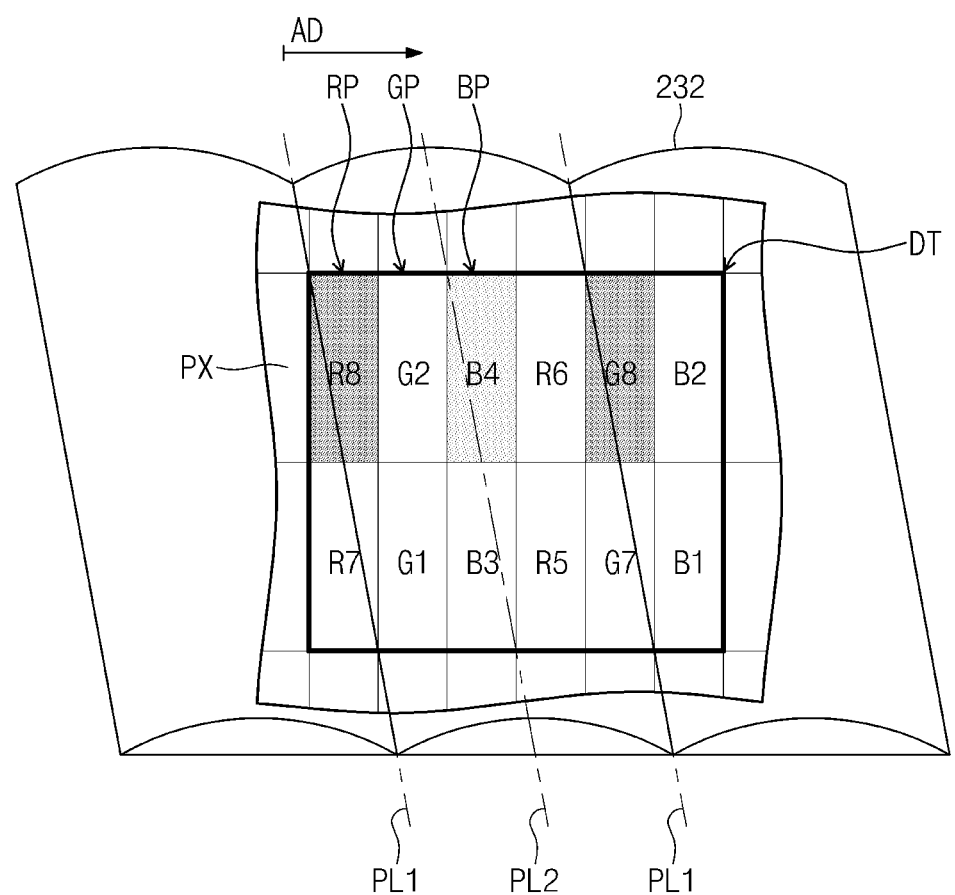

FIG. 6A is a view showing the display panel and the viewpoint forming device shown in FIG. 5 in a first sub-frame SF1, and FIG. 6B is a view showing the display panel and the viewpoint forming device shown in FIG. 5 in a second sub-frame SF2. In FIG. 6A and FIG. 6B, a reference numeral shown in each pixel PX indicates the viewpoint of the color image displayed in each pixel PX. For instance, "B8" indicates the blue image of the eighth viewpoint image.

Referring to FIG. 6A and FIG. 6B, the 3D image display device 1000 (refer to FIG. 1) is operated in the first sub-frame SF1 or the second sub-frame SF2 during the 3D mode. The dot DT displays different images during the first and second sub-frames SF1 and SF2 and the lenticular lenses 232 move from a first position to a second position when the first sub-frame SF1 is switched to the second sub-frame SF2.

In the first sub-frame SF1, the dot DT displays one color image of each of the first, second, seventh, and eighth viewpoint images. For instance, the blue pixel BP arranged in the first row and the third column of the dot DT displays the blue image B8 of the eighth viewpoint image.

In addition, the dot DT displays two color images of each of the third, fourth, fifth, and sixth viewpoint images. For instance, the red pixel RP arranged in the first row and the first column of the dot DT and the green pixel GP arranged in the first row and the fifth column of the dot respectively display the red image R4 and the green image G4 of the fourth viewpoint image.

As shown in FIG. 6A and FIG. 6B, a plurality of projection lines, which are substantially parallel to the long axis LA and arranged in the row direction, are defined in each of the lenticular lenses 232. For the convenience of explanation, only the first and second projection lines PL1 and PL2 corresponding to the fourth and eighth viewing zones VZ4 and VZ8 will be described in detail, and details of the others will be omitted. Portions of the dot DT, which are mainly overlapped with the first and second projection lines PL1 and PL2, are refracted by the lenticular lenses 232 at a specific angle and projected on the fourth and eighth viewing zones VZ4 and VZ8.

For instance, during the first sub-frame SF1, the first projection line PL1 is mainly overlapped with the red and green pixels RP and GP respectively displaying the red and green images R4 and G4 of the fourth viewpoint image to project the red and green images R4 and G4 of the fourth viewpoint image on the fourth viewing zone VZ4. Meanwhile, since the first projection line PL1 is partially overlapped with the red and green pixels RP and GP respectively displaying the red and green images of the third viewpoint image, a portion of the red and green images R3 and G3 of the third viewpoint image is projected on the fourth viewing zone VZ4. As a result, a crosstalk occurs in the fourth viewing zone VZ4.

In the first sub-frame SF1, the second projection line PL2 is mainly overlapped with the blue pixel BP displaying the blue image B8 of the eighth viewpoint image to project the blue image B8 of the eighth viewpoint image on the eighth viewing zone VZ8.

During the second sub-frame SF2 shown in FIG. 6B, the dot DT displays two color images of each of the first, second, seventh, and eighth viewpoint images. For instance, the red pixel RP arranged in the first row and the first column of the dot DT and the green pixel GP arranged in the first row and the fifth column of the dot DT respectively display the red and green images R8 and G8 of the eighth viewpoint image.

In addition, during the second sub-frame SF2, the dot DT displays the color images of the viewpoint images, which are not displayed in the first sub-frame SF1. In more detail, the dot DT displays one color image of each of the third, fourth, fifth, and sixth viewpoint images. For example, the blue pixel BP arranged in the first row and the third column of the dot DT displays the blue image B4 of the fourth viewpoint image.

In the second sub-frame SF2, the lenticular lenses 232 move from a first position to a second position spaced apart from the first position by a distance AD along the row direction. In the present exemplary embodiment, the distance AD satisfies the following Equation 3:

$$AD = \frac{P}{2} \qquad \text{Eq. 3}$$

In the present exemplary embodiment, since the pitch P is obtained by multiplying the width Wh by 4, the distance AD is obtained by multiplying the width Wh by 2. Therefore, the distance AD corresponds to the sum of the width Wh in the row direction of two pixels PX.

When the lenticular lenses 232 move along the row direction by the distance AD in the second sub-frame SF2, the first and second projection lines PL1 and PL2 move along the row direction by the distance AD.

Thus, during the second sub-frame SF2, the first projection line PL1 is mainly overlapped with the red and green pixels RP and GP respectively displaying the red and green images R8 and G8 of the eighth viewpoint image, and the red and green images R8 and G8 of the eighth viewpoint image are projected on the eighth viewing zone VZ8.

In addition, during the second sub-frame SF2, the second projection line PL2 is mainly overlapped with the blue pixel BP displaying the blue image B4 of the four viewpoint image, and the blue image B4 of the fourth viewpoint image is projected on the fourth viewing zone VZ4.

As described above, the dot DT displays the red, green, and blue images R4, G4, and B4 of the fourth viewpoint image, and the red, green, and blue images R8, G8, and B8 of the eighth viewpoint image in the first and second sub-frames SF1 and SF2 through the red, green, and blue pixels RP, GP, and BP arranged in the same first row.

In the above-mentioned descriptions, only the fourth and eighth viewpoint images have been described, but red, green, and blue images of the other viewpoint images are projected on corresponding viewing zones in the first and second sub-frames SF1 and SF2 in a manner similar to the red, green, and blue images of the fourth and eighth viewpoint images.

Consequently, since the 3D image display device 1000 (refer to FIG. 1) projects the red, green, and blue images of each of the first to eighth viewpoint images on corresponding viewing zones in the first and second sub-frames SF1 and SF2, a viewer VU recognizes the images during the first and second sub-frames SF1 and SF2 and perceives the 3D image having the color.

As described above, when the 3D image having the color is realized through the first and second sub-frames SF1 and SF2, the number kn of the viewpoint images (or the number of viewpoints) is increased. In more detail, since the dot DT includes M×N pixels and displays the image having three colors per each viewpoint image through the two sub-frames, the number kn of the viewpoint images displayed through the dot DT by the 3D image display device 1000 satisfies the following Equation 4:

$$Kn = 2/3 M \cdot N \qquad \text{Eq. 4}$$

The 3D image display device 1000 according to the present exemplary embodiment displays the 3D image including three primary colors, e.g., red, green, and blue colors, in the two sub-frames. That is, since the display panel 100 (refer to FIG. 1) may be operated in a time division driving method during the sub-frames, the number of which are provided less than the number of the colors of each viewpoint image, the display panel 100 may be operated with a relatively low frequency. Accordingly, the display panel 100 may be operated in a stable manner.

In addition, since the pixels PX are arranged in the matrix form in the dot DT, a non-uniform deterioration of the resolution of the 3D image in the row and column directions may be prevented.

Figure 7A:
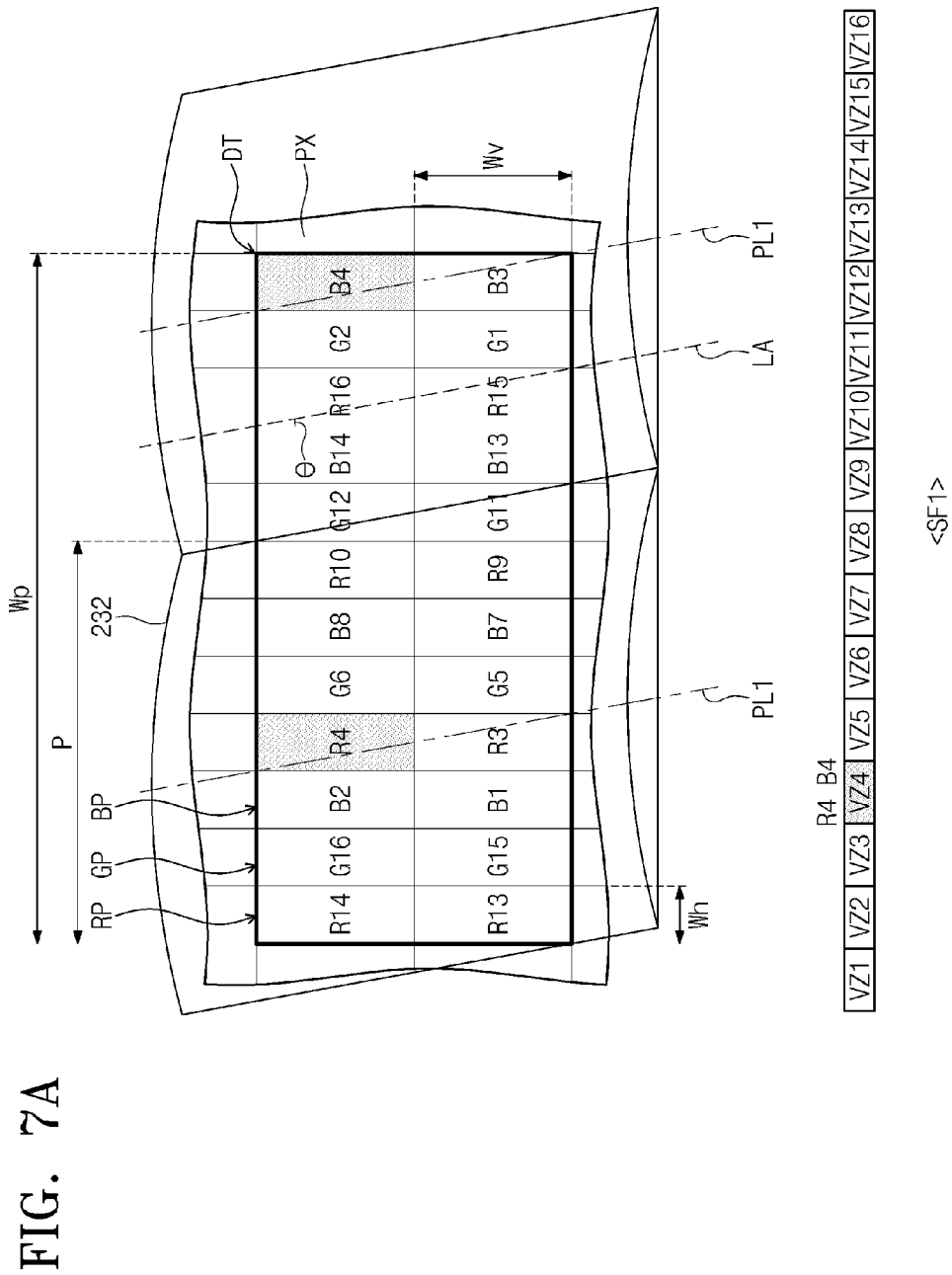

FIG. 7A is a view showing a display panel and a viewpoint forming device in a first sub-frame according to another exemplary embodiment of the present disclosure and FIG. 7B is a view showing a display panel and a viewpoint forming device in a second sub-frame according to another exemplary embodiment of the present disclosure.

Referring to FIG. 7A and FIG. 7B, the number N of the columns of the dot DT is twelve and the number M of the rows of the dot DT is two. Accordingly, the width Wp of the dot DT, the pitch P of the lenticular lenses 232, and the distance AD are 12×Wh, 8×Wh, and 4×Wh, respectively. In addition, the number kn of the viewpoint images is sixteen in the present exemplary embodiment.

The dot DT displays first to sixteenth viewpoint images, each including red, green, and blue images, and the lenticular lenses 232 projects the first to sixteenth viewpoint images on first to sixteenth viewing zones VZ1 to VZ16, respectively.

The angle θ of the long axis LA of each of the lenticular lenses 232 satisfies the following Equation 5:

$$\tan\theta = \frac{Wh}{2 \cdot Wv} \qquad \text{Eq. 5}$$

The dot DT displays different images during the first sub-frame SF1 and second sub-frame SF2, and the lenticular lenses 232 move from a first position to a second position spaced apart from the first position by the distance AD when the first sub-frame SF1 is switched to the second sub-frame SF2.

In the first sub-frame SF1, the dot DT displays two color images of the first to fourth viewpoint images and the thirteenth to sixteenth viewpoint images. For instance, the red pixel RP arranged in the first row and the fourth column of the dot DT, and the blue pixel BP arranged in the first row and the twelfth column of the dot DT, respectively, display the red and blue images R4 and B4 of the fourth viewpoint image.

In the first sub-frame SF1, the first projection line PL1 corresponding to the fourth viewing zone VZ4 is mainly overlapped with the red and blue pixels RP and BP respectively displaying the red and blue images R4 and B4 of the fourth viewpoint image, and thus, the red and blue images R4 and B4 of the fourth viewpoint image are projected on the fourth viewing zone VZ4.

Meanwhile, the dot DT displays the color images of the viewpoint images, which are not displayed in the first sub-frame SF1, during the second sub-frame SF2. In more detail, the dot DT displays one color image of the first to fourth viewpoint images and the thirteenth to sixteenth viewpoint images. For instance, the green pixel GP arranged in the first row and the eighth column of the dot DT displays the green image G4 of the fourth viewpoint image.

When the lenticular lenses 232 move along the row direction by the distance AD in the second sub-frame SF2, the first projection line PL1 moves along the row direction by the distance AD. Thus, during the second sub-frame SF2, the first projection line PL1 is mainly overlapped with the green pixel GP displaying the green image G4 of the fourth viewpoint image, and the green image G4 of the fourth viewpoint image is projected on the fourth viewing zone VZ4.

As described above, the dot DT displays the red, green, and blue images R4, G4, and B4 of the fourth viewpoint image in the first and second sub-frames SF1 and SF2 through the red, green, and blue pixels RP, GP, and BP arranged in the same first row.

In the above-mentioned descriptions, only the fourth viewpoint image has been described, but red, green, and blue images of the other viewpoint images are projected on corresponding viewing zones in the first and second sub-frames SF1 and SF2 in a manner similar to the red, green, and blue images of the fourth viewpoint image.

Consequently, since the 3D image display device 1000 projects the red, green, and blue images of each of the first to sixteenth viewpoint images on corresponding viewing zones in the first and second sub-frames SF1 and SF2, the viewer VU recognizes the images during the first and second sub-frames SF1 and SF2 and perceives the 3D image having the color.

Figure 8A:
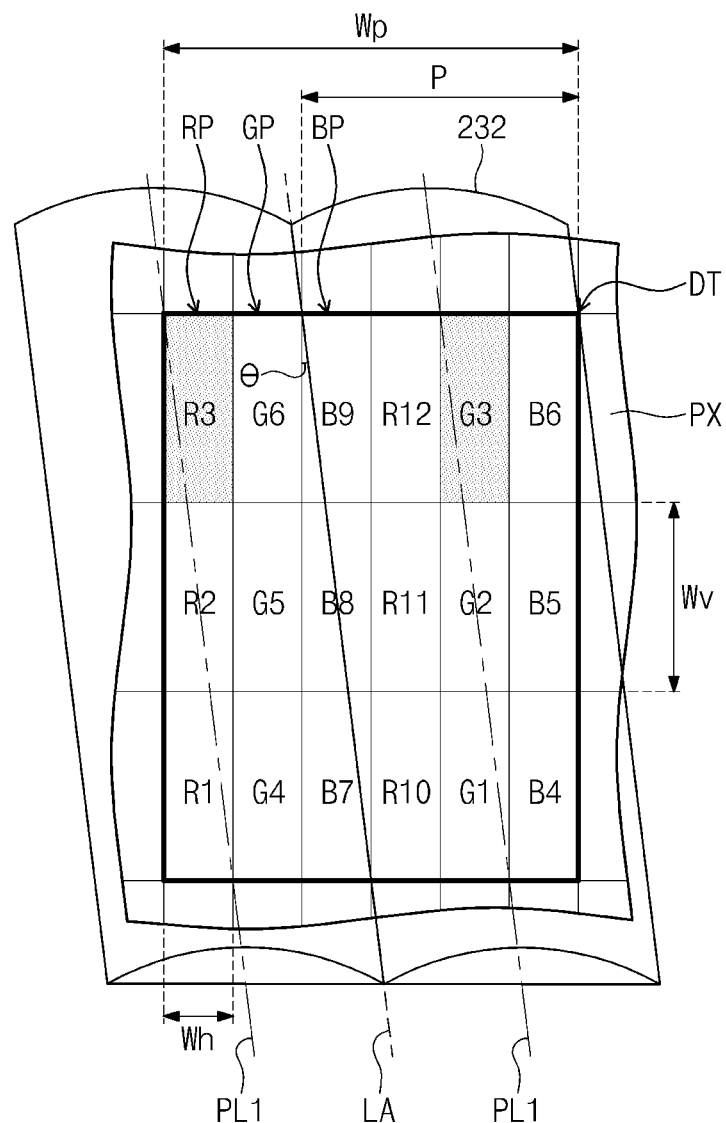
FIG. 8A and FIG. 8B are views showing a display panel and a viewpoint forming device in first and second sub-frames according to another exemplary embodiment of the present disclosure.
Figure 8B:
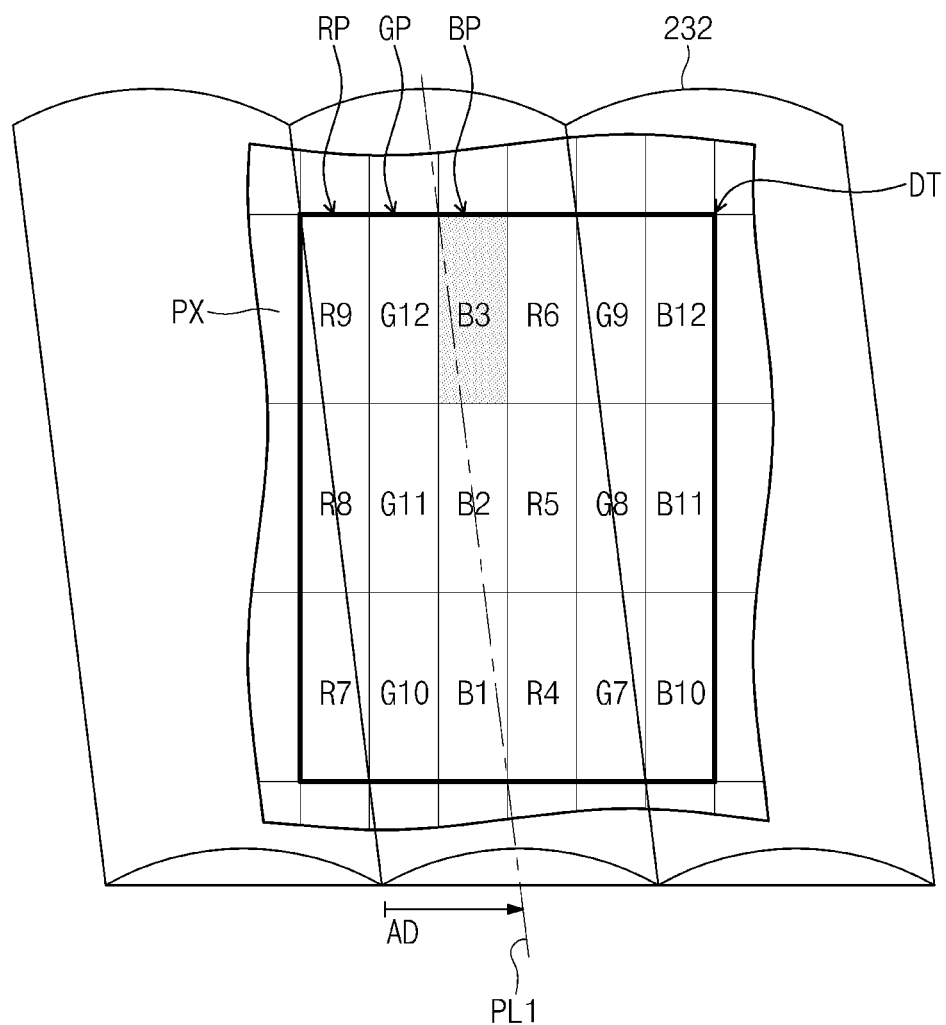

FIG. 8A is a view showing a display panel and a viewpoint forming device in a first sub-frame according to another exemplary embodiment of the present disclosure, and FIG. 8B is a view showing a display panel and a viewpoint forming device in a second sub-frame according to another exemplary embodiment of the present disclosure.

Referring to FIG. 8A and FIG. 8B, the number N of the columns of the dot DT is six and the number M of the rows of the dot DT is three. Therefore, the width Wp of the dot DT, the pitch P of the lenticular lenses 232, and the distance AD are 6×Wh, 4×Wh, and 2×Wh, respectively. In addition, the number kn of the viewpoint images is 12 in the present exemplary embodiment.

The dot DT displays first to twelfth viewpoint images, each including red, green, and blue images, and the lenticular lenses 232 projects the first to twelfth viewpoint images on first to twelfth viewing zones VZ1 to VZ12, respectively.

The angle θ of the long axis LA of each of the lenticular lenses 232 satisfies the following Equation 6:

$$\tan\theta = \frac{W_h}{3 \cdot W_v} \qquad \text{Eq. 6}$$

The dot DT displays different images during the first and second sub-frames SF1 and SF2, and the lenticular lenses 232 move from a first position to a second position spaced apart from the first position by the distance AD when the first sub-frame SF1 is switched to the second sub-frame SF2.

In the first sub-frame SF1, the dot DT displays two color images of the first to sixth viewpoint images. For instance, the red pixel RP arranged in the first row and the first column of the dot DT, and the green pixel GP arranged in the first row and the twelfth column of the dot DT respectively display the red and green images R3 and G3 of the third viewpoint image.

In the first sub-frame SF1, the first projection line PL1 corresponding to the third viewing zone VZ3 is mainly overlapped with the red and green pixels RP and GP respectively displaying the red and green images R3 and G3 of the third viewpoint image. Thus, the red and green images R3 and G3 of the third viewpoint image are projected on the third viewing zone VZ3.

Meanwhile, the dot DT displays the color images of the viewpoint images, which are not displayed in the first sub-frame SF1, during the second sub-frame SF2. In more detail, the dot DT displays one color image of the first to sixth viewpoint images. For instance, the blue pixel BP arranged in the first row and the third column of the dot DT displays the blue image B3 of the third viewpoint image.

When the lenticular lenses 232 move along the row direction by the distance AD in the second sub-frame SF2, the first projection line PL1 moves along the row direction by the distance AD.

Thus, during the second sub-frame SF2, the first projection line PL1 is mainly overlapped with the blue pixel BP displaying the blue image B3 of the third viewpoint image, and the blue image B3 of the third viewpoint image is projected on the third viewing zone VZ3.

As described above, the dot DT displays the red, green, and blue images R3, G3, and B3 of the third viewpoint image in the first and second sub-frames SF1 and SF2 through the red, green, and blue pixels RP, GP, and BP arranged in the same first row.

In the above-mentioned descriptions, only the third viewpoint image has been described, but red, green, and blue images of the other viewpoint images are projected on corresponding viewing zones in the first and second sub-frames SF1 and SF2 in a manner similar to the red, green, and blue images of the third viewpoint image.

Consequently, since the 3D image display device 1000 projects the red, green, and blue images of each of the first to twelfth viewpoint images on corresponding viewing zones in the first and second sub-frames SF1 and SF2, the viewer VU recognizes the images during the first and second sub-frames SF1 and SF2 and perceives the 3D image having the color.

Figure 9A:
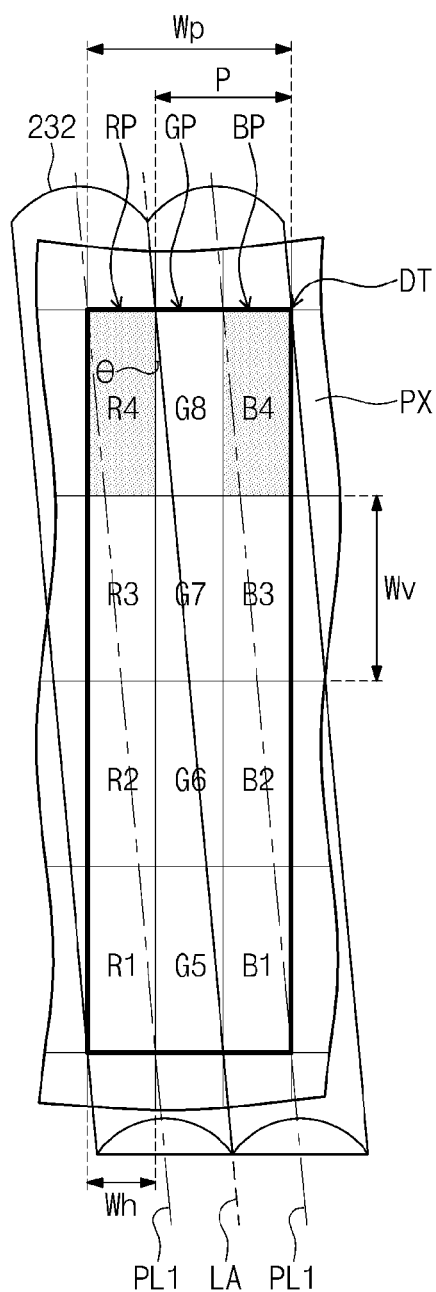
FIG. 9A and FIG. 9B are views showing a display panel and a viewpoint forming device in first and second sub-frames according to another exemplary embodiment of the present disclosure.
Figure 9B:
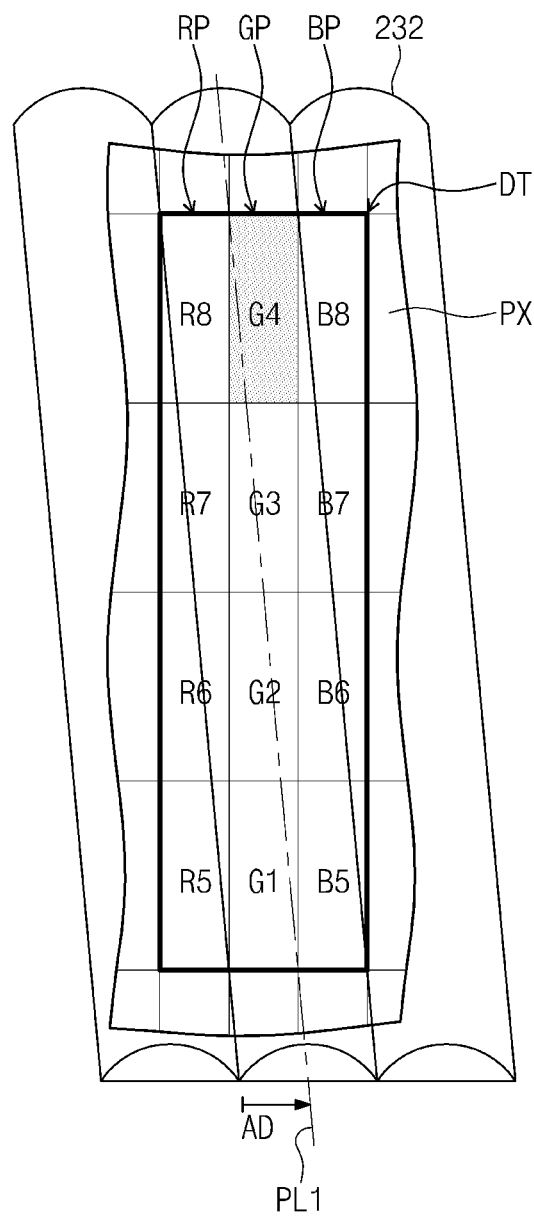

FIG. 9A is a view showing a display panel and a viewpoint forming device in a first sub-frame according to another exemplary embodiment of the present disclosure, and FIG. 9B is a view showing a display panel and a viewpoint forming device in a second sub-frame according to another exemplary embodiment of the present disclosure.

Referring to FIG. 9A and FIG. 9B, the number N of the columns of the dot DT is three and the number M of the rows of the dot DT is four. In this case, the width Wp of the dot DT, the pitch P of the lenticular lenses 232, and the distance AD are 3×Wh, 2×Wh, and 1×Wh, respectively. In addition, the number kn of the viewpoint images is eight in the present exemplary embodiment.

The dot DT displays first to eighth viewpoint images, each including red, green, and blue images, and the lenticular lenses 232 projects the first to eighth viewpoint images on first to eighth viewing zones VZ1 to VZ8, respectively.

The angle θ of the long axis LA of each of the lenticular lenses 232 satisfies the following Equation 7:

$$\tan\theta = \frac{W_h}{4 \cdot W_v} \qquad \text{Eq. 7}$$

The dot DT displays different images during the first and second sub-frames SF1 and SF2, and the lenticular lenses 232 move from a first position to a second position spaced apart from the first position by the distance AD when the first sub-frame SF1 is switched to the second sub-frame SF2.

In the first sub-frame SF1, the dot DT displays two color images of the first to fourth viewpoint images. For instance, the red pixel RP arranged in the first row and the first column of the dot DT and the blue pixel BP arranged in the first row and the third column of the dot DT respectively display the red and blue images R4 and B4 of the fourth viewpoint image.

In the first sub-frame SF1, the first projection line PL1 corresponding to the fourth viewing zone VZ4 is mainly overlapped with the red and blue pixels RP and BP respectively displaying the red and blue images R4 and B4 of the fourth viewpoint image. Thus, the red and blue images R4 and B4 of the fourth viewpoint image are projected on the fourth viewing zone VZ4.

Meanwhile, the dot DT displays the color images of the viewpoint images, which are not displayed in the first sub-frame SF1, during the second sub-frame SF2. In more detail, the dot DT displays one color image of the first to fourth viewpoint images. For instance, the green pixel GP arranged in the first row and the second column of the dot DT displays the green image G4 of the fourth viewpoint image.

When the lenticular lenses 232 move along the row direction by the distance AD in the second sub-frame SF2, the first projection line PL1 moves along the row direction by the distance AD.

Thus, during the second sub-frame SF2, the first projection line PL1 is mainly overlapped with the green pixel GP displaying the green image G4 of the fourth viewpoint image, and the green image G4 of the fourth viewpoint image is projected on the fourth viewing zone VZ4.

As described above, the dot DT displays the red, green, and blue images R4, G4, and B4 of the fourth viewpoint image in the first and second sub-frames SF1 and SF2 through the red, green, and blue pixels RP, GP, and BP arranged in the same first row.

In the above-mentioned descriptions, only the fourth viewpoint image has been described, but red, green, and blue images of the other viewpoint images are projected on corresponding viewing zones in the first and second sub-frames SF1 and SF2 in a manner similar to the red, green, and blue images of the fourth viewpoint image.

Consequently, since the 3D image display device 1000 projects the red, green, and blue images of each of the first to eighth viewpoint images on corresponding viewing zones in the first and second sub-frames SF1 and SF2, the viewer VU recognizes the images during the first and second sub-frames SF1 and SF2, and perceives the 3D image having the color.

Figure 10A:
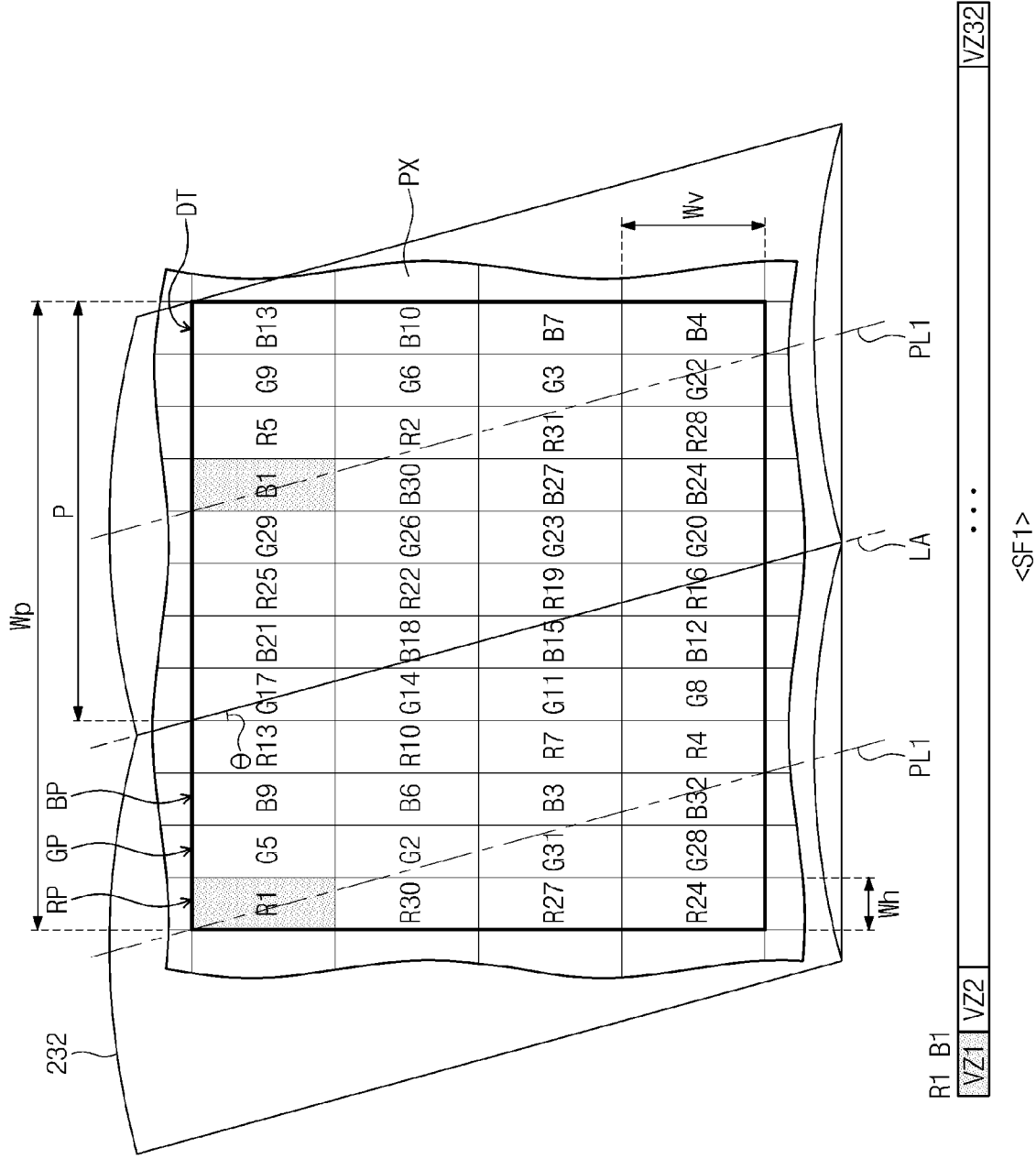
FIG. 10A and FIG. 10B are views showing a display panel and a viewpoint forming device in first and second sub-frames according to another exemplary embodiment of the present disclosure.
Figure 10B:
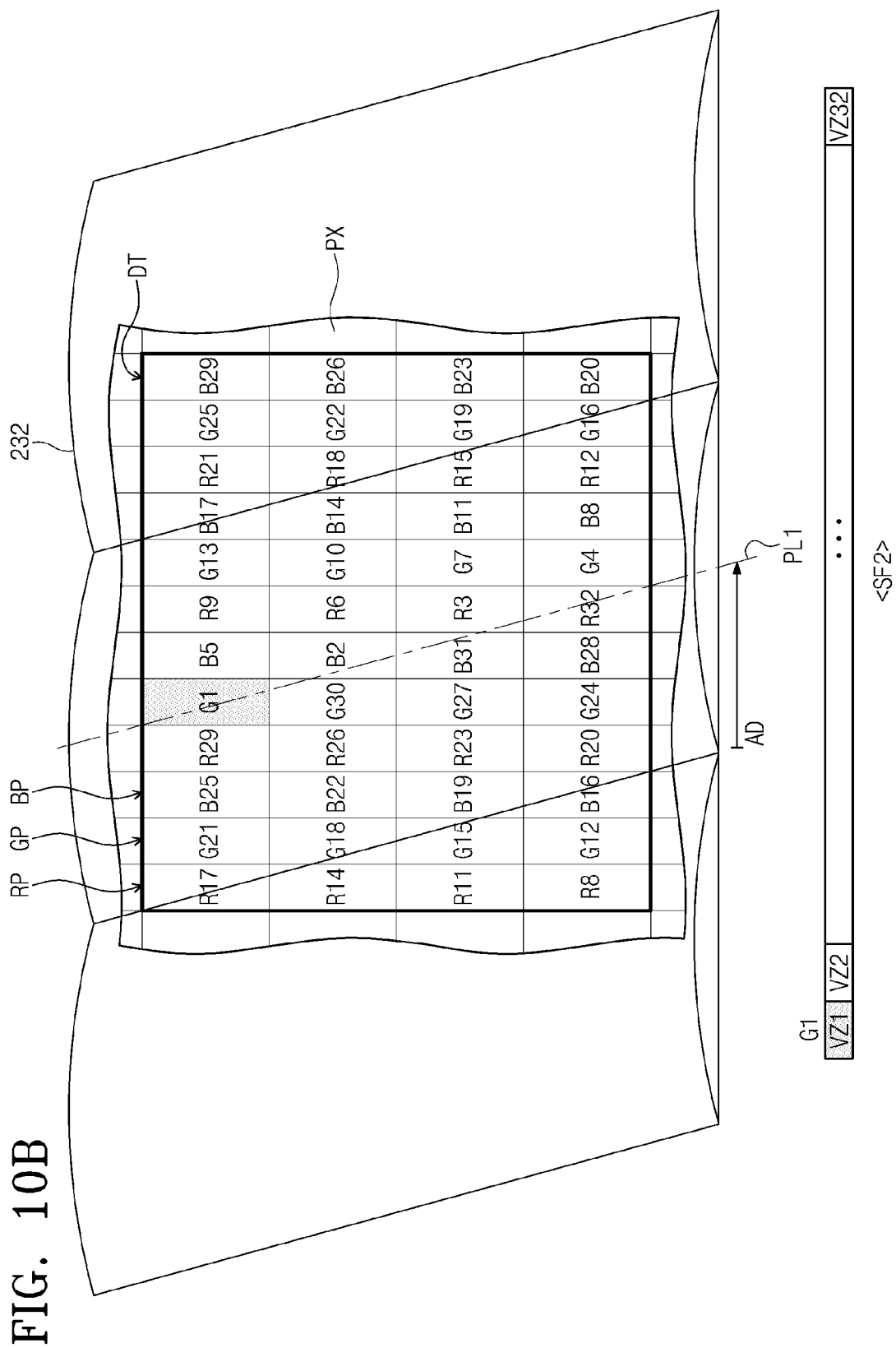

FIG. 10A is a view showing a display panel and a viewpoint forming device in a first sub-frame according to another exemplary embodiment of the present disclosure and FIG. 10B is a view showing a display panel and a viewpoint forming device in a second sub-frame according to another exemplary embodiment of the present disclosure.

Referring to FIG. 10A and FIG. 10B, the number N of the columns of the dot DT is twelve and the number M of the rows of the dot DT is four. Therefore, the width Wp of the dot DT, the pitch P of the lenticular lenses 232, and the distance AD are 12×Wh, 8×Wh, and 4×Wh, respectively. In addition, the number kn of the viewpoint images is thirty two in the present exemplary embodiment.

The dot DT displays first to thirty-second viewpoint images, each including red, green, and blue images, and the lenticular lenses 232 projects the first to thirty-second viewpoint images on first to thirty-second viewing zones VZ1 to VZ32, respectively.

The angle θ of the long axis LA of each of the lenticular lenses 232 satisfies the following Equation 8:

$$\tan\theta = \frac{3 \cdot Wh}{4 \cdot Wv} \qquad \text{Eq. 8}$$

The dot DT displays different images during the first and second sub-frames SF1 and SF2, and the lenticular lenses 232 move from a first position to a second position spaced apart from the first position by the distance AD when the first sub-frame SF1 is switched to the second sub-frame SF2.

In the first sub-frame SF1, the dot DT displays two color images of the first to thirty-second viewpoint images. For instance, the red pixel RP arranged in the first row and the first column of the dot DT and the blue pixel BP arranged in the first row and the ninth column of the dot DT respectively display the red and blue images R1 and B1 of the first viewpoint image.

In the first sub-frame SF1, the first projection line PL1 corresponding to the first viewing zone VZ1 is mainly overlapped with the red and blue pixels RP and BP respectively displaying the red and blue images R1 and B1 of the first viewpoint image. Thus, the red and blue images R1 and B1 of the first viewpoint image are projected on the first viewing zone VZ1.

Meanwhile, the dot DT displays the color images of the viewpoint images, which are not displayed in the first sub-frame SF1, during the second sub-frame SF2. For instance, the green pixel GP arranged in the first row and the fifth column of the dot DT displays the green image G1 of the first viewpoint image.

When the lenticular lenses 232 move along the row direction by the distance AD in the second sub-frame SF2, the first projection line PL1 moves along the row direction by the distance AD.

Thus, during the second sub-frame SF2, the first projection line PL1 is mainly overlapped with the green pixel GP displaying the green image G1 of the first viewpoint image, and the green image G1 of the first viewpoint image is projected on the first viewing zone VZ1.

As described above, the dot DT displays the red, green, and blue images R1, G1, and B1 of the first viewpoint image in the first and second sub-frames SF1 and SF2 through the red, green, and blue pixels RP, GP, and BP arranged in the same first row.

In the above-mentioned descriptions, only the first viewpoint image has been described, but red, green, and blue images of the other viewpoint images are projected on corresponding viewing zones in the first and second sub-frames SF1 and SF2 in a manner similar to the red, green, and blue images of the first viewpoint image.

Consequently, since the 3D image display device 1000 projects the red, green, and blue images of each of the first to thirty-second viewpoint images on corresponding viewing zones in the first and second sub-frames SF1 and SF2, the viewer VU recognizes the images during the first and second sub-frames SF1 and SF2 and perceives the 3D image having the color.

In general, a ratio of the width Wv in the column direction of each pixel PX and the width Wh in the row direction of each pixel PX is 3:1. Accordingly, when a ratio of the number N of the columns of the dot DT and the number M of the rows of the dot DT becomes 3:1, the width Wp in the row direction of the dot DT is substantially the same as a width in the column direction of the dot DT. Therefore, the dot DT may have a square shape.

In other words, in the case that the ratio of the width Wh in the row direction of the pixels and the width Wv in the column direction of the pixel PX is A:B ("A" and "B" are natural numbers), the ratio of the number M of the rows of the dot DT and the number N of the columns of the dot DT is controlled to have A:B to allow the dot DT to have a square shape.

Figure 11A:
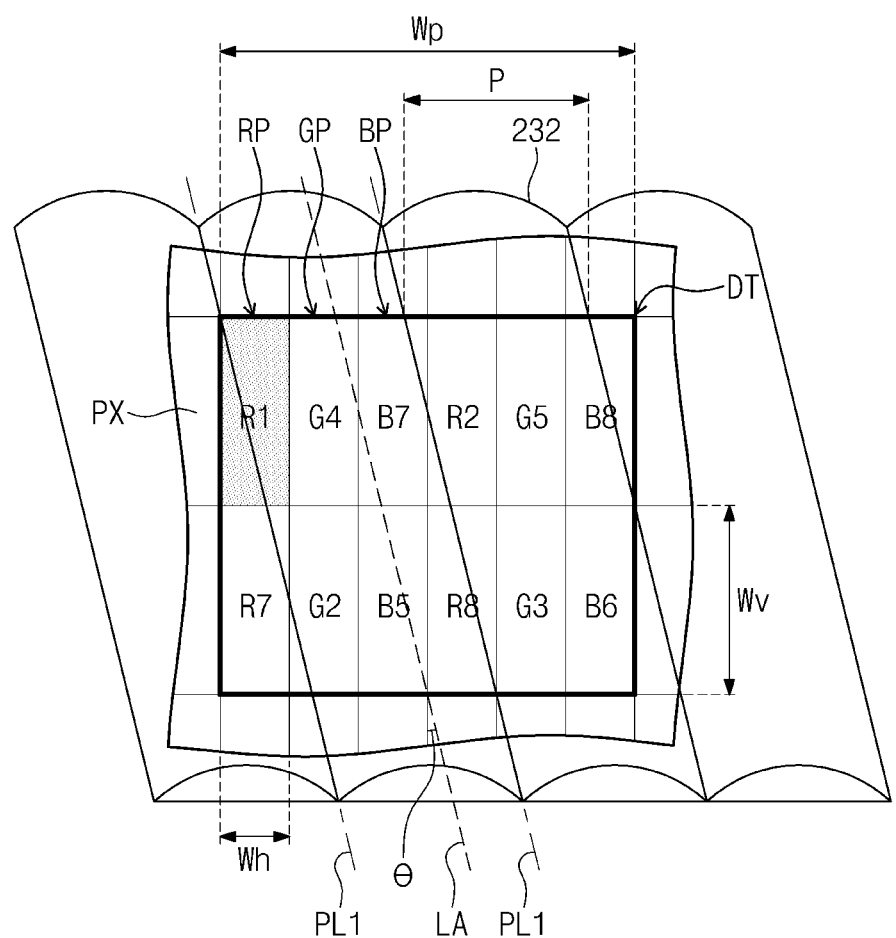
FIG. 11A and FIG. 11B are views showing a display panel and a viewpoint forming device in first and second sub-frames according to another exemplary embodiment of the present disclosure.
Figure 11A:
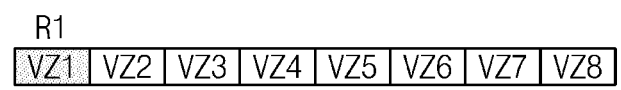
Figure 11B:
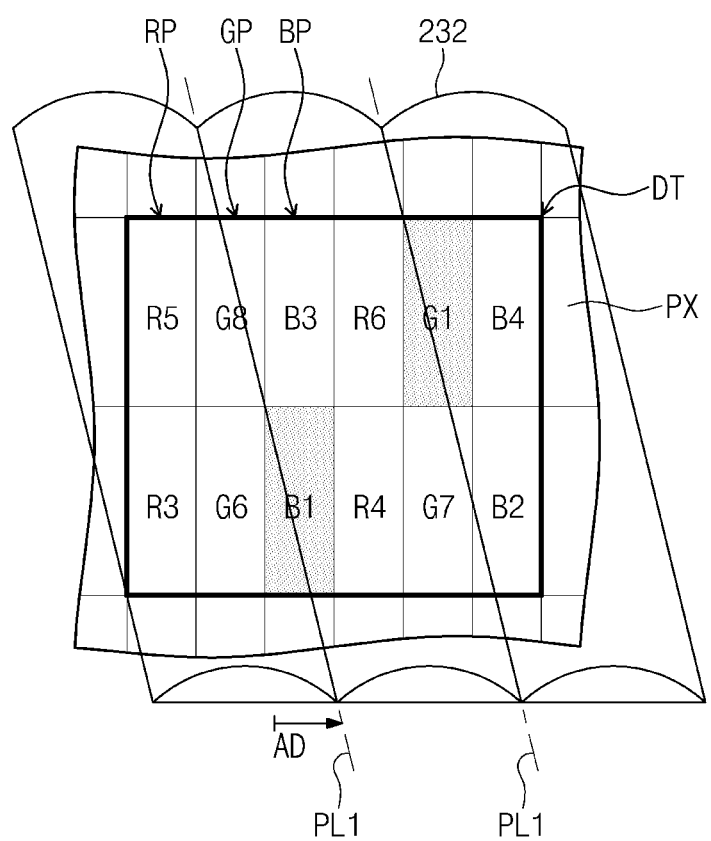

FIG. 11A is a view showing a display panel and a viewpoint forming device in a first sub-frame according to another exemplary embodiment of the present disclosure, and FIG. 11B is a view showing a display panel and a viewpoint forming device in a second sub-frame according to another exemplary embodiment of the present disclosure.

Referring to FIG. 11A and FIG. 11B, the number N of the columns of the dot DT is six and the number M of the rows of the dot DT is two. Accordingly, the width Wp of the dot DT is 6×Wh.

The pitch P of the lenticular lenses 232 satisfies the following Equation 9:

$$0 < P \leq 4/9 \cdot Wp \qquad \text{Eq. 9}$$

In the present exemplary embodiment, since the pitch Wp is 6×Wh, the pitch P of the lenticular lenses 232 is 8/3·Wh. Therefore, the distance AD is $$AD = \frac{P}{2} = \frac{8}{3}Wh.$$

In the present exemplary embodiment, the number kn of the viewpoint images is eight.

The dot DT displays first to eighth viewpoint images, each including red, green, and blue images, and the lenticular lenses 232 project the first to eighth viewpoint images on first to eighth viewing zones VZ1 to VZ8.

The red pixels RP are arranged in the first and fourth columns of the dot DT, the green pixels GP are arranged in the second and fifth columns of the dot DT, and the blue pixels BP are arranged in the third and sixth columns of the dot DT.

Since the pitch P of each of the lenticular lens 232 is less than the width Wp in the row direction of the dot DT, at least two lenticular lenses 232 are required to cover the dot DT.

The angle θ of the long axis LA of each of the lenticular lenses 232 satisfies the following Equation 10:

$$\tan\theta = \frac{2 \cdot Wh}{3 \cdot Wv} \qquad \text{Eq. 10}$$

The dot DT displays different images during the first and second sub-frames SF1 and SF2, and the lenticular lenses 232 move from a first position to a second position spaced apart from the first position by the distance AD when the first sub-frame SF1 is switched to the second sub-frame SF2.

In the first sub-frame SF1, the dot DT displays one color image of the first, third, fourth, and sixth viewpoint images. For instance, the red pixel RP arranged in the first row and the first column of the dot DT displays the red image R1 of the first viewpoint image.

In the first sub-frame SF1, the first projection line PL1 corresponding to the first viewing zone VZ1 is mainly overlapped with the red pixel RP displaying the red image R1 of the first viewpoint image. Thus, the red image R1 of the first viewpoint image is projected on the first viewing zone VZ1.

Meanwhile, the dot DT displays the color images of the viewpoint images, which are not displayed in the first sub-frame SF1, during the second sub-frame SF2. In more detail, the dot DT displays two color images of the first, third, fourth, and sixth viewpoint images. For instance, the green pixel GP arranged in the first row and the fifth column of the dot DT and the blue pixel BP arranged in the second row and the third column of the dot DT respectively display the green image G1 and the blue image B1 of the first viewpoint image.

When the lenticular lenses 232 move along the row direction by the distance AD in the second sub-frame SF2, the first projection line PL1 moves along the row direction by the distance AD.

Thus, during the second sub-frame SF2, the first projection line PL1 is mainly overlapped with the green and blue pixels GP and BP respectively displaying the green and blue images G1 and B1 of the first viewpoint image, and the green and blue images G1 and B1 of the first viewpoint image are projected on the first viewing zone VZ1.

As described above, the dot DT displays the red, green, and blue images R1, G1, and B1 of the first viewpoint image in the first and second sub-frames SF1 and SF2 through the red and green pixels RP and GP arranged in the first row and the blue pixel BP arranged in the same second row.

In the above-mentioned descriptions, only the first viewpoint image has been described, but red, green, and blue images of the other viewpoint images are projected on corresponding viewing zones in the first and second sub-frames SF1 and SF2 in a manner similar to the red, green, and blue images of the first viewpoint image.

Consequently, since the 3D image display device 1000 projects the red, green, and blue images of each of the first to eighth viewpoint images on corresponding viewing zones in the first and second sub-frames SF1 and SF2, the viewer VU recognizes the images during the first and second sub-frames SF1 and SF2 and perceives the 3D image having the color.

Figure 12A:
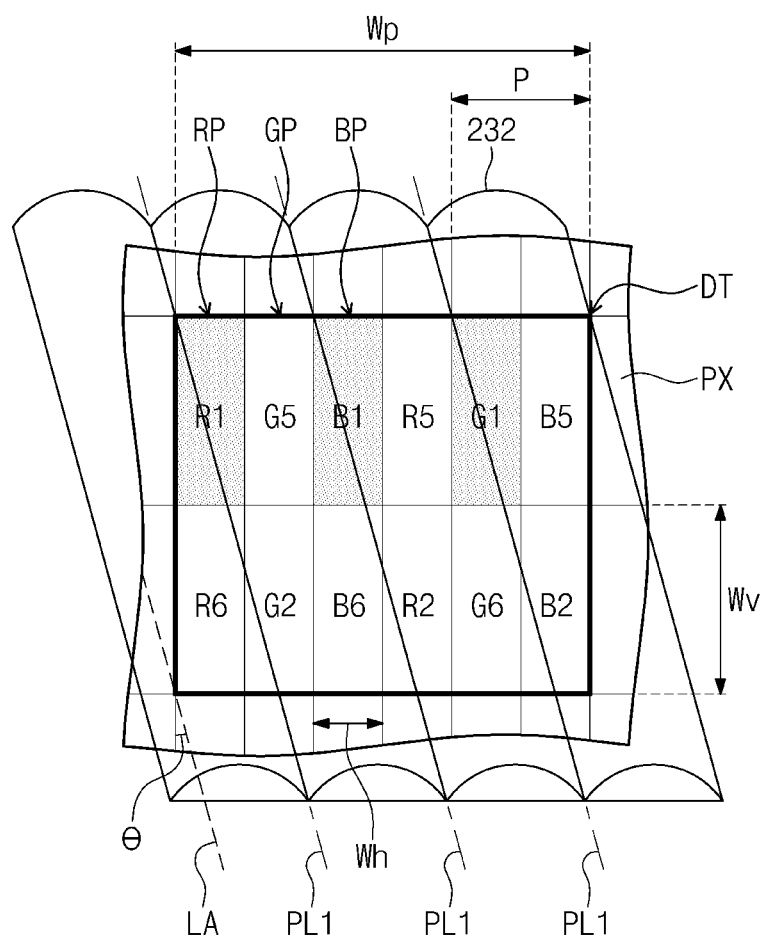
FIG. 12A and FIG. 12B are views showing a display panel and a viewpoint forming device in first and second sub-frames according to another exemplary embodiment of the present disclosure.
Figure 12B:
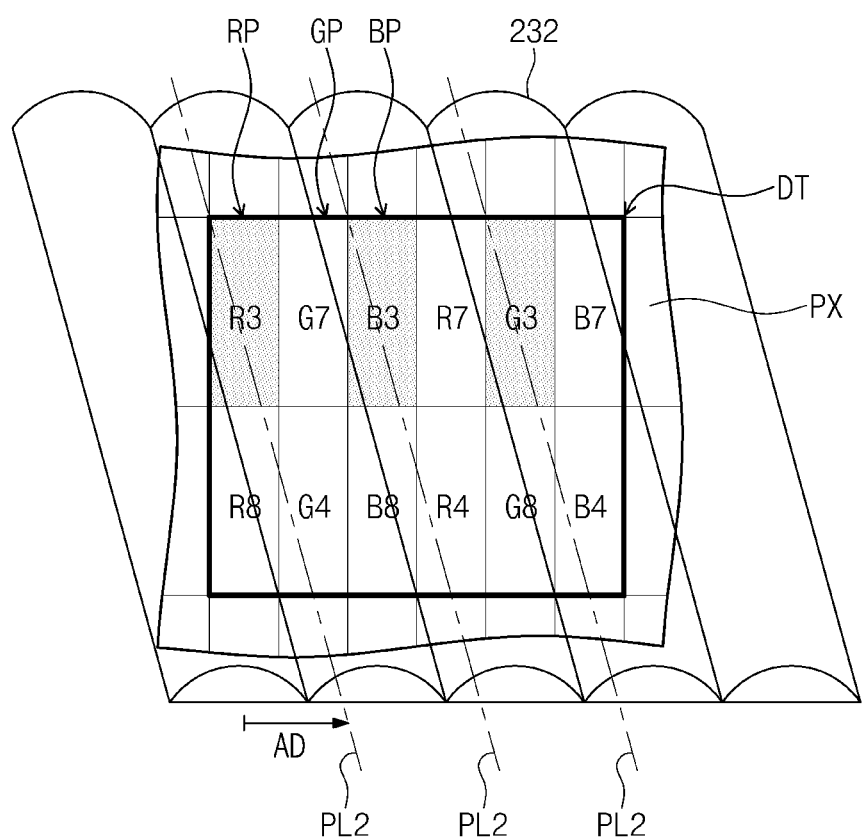

FIG. 12A is a view showing a display panel and a viewpoint forming device in a first sub-frame according to another exemplary embodiment of the present disclosure, and FIG. 12B is a view showing a display panel and a viewpoint forming device in a second sub-frame according to another exemplary embodiment of the present disclosure.

Referring to FIG. 12A and FIG. 12B, the number N of the columns of the dot DT is six and the number M of the rows of the dot DT is two. Accordingly, the width Wp of the dot DT is 6×Wh.

The pitch P of the lenticular lenses 232 and the distance AD satisfy the following Equations 11 and 12:

$$0 < P \leq 1/3 \cdot Wp \qquad \text{Eq. 11}$$

$$AD = 3/4 P \qquad \text{Eq. 12}$$

In the present exemplary embodiment, since the width Wp is 6×Wh, the pitch P of the lenticular lenses 232 is 2×Wh, and the distance AD is 3/2Wh.

In the present exemplary embodiment, the number kn of the viewpoint images is eight. The dot DT displays first to eighth viewpoint images, each including red, green, and blue images, and the lenticular lenses 232 project the first to eighth viewpoint images on first to eighth viewing zones VZ1 to VZ8.

The red pixels RP are arranged in the first and fourth columns of the dot DT, the green pixels GP are arranged in the second and fifth columns of the dot DT, and the blue pixels BP are arranged in the third and sixth columns of the dot DT.

Since the pitch P of each of the lenticular lens 232 is less than the width Wp in the row direction of the dot DT, at least three lenticular lenses 232 are required to cover the dot DT.

The angle θ of the long axis LA of each of the lenticular lenses 232 satisfies the following Equation 13:

$$\tan\theta = \frac{3 \cdot Wh}{4 \cdot Wv} \qquad \text{Eq. 13}$$

The dot DT displays different images during the first and second sub-frames SF1 and SF2 and the lenticular lenses 232 move from a first position to a second position spaced apart from the first position by the distance AD when the first sub-frame SF1 is switched to the second sub-frame SF2.

In the first sub-frame SF1, the dot DT displays three color images of the first, second, fifth, and sixth viewpoint images. For instance, the red pixel RP arranged in the first row and the first column of the dot DT, the blue pixel BP arranged in the first row and the third column of the dot DT, and the green pixel GP arranged in the first row and the fifth column of the dot DT respectively display the red, blue, and green images R1, B1, and G1 of the first viewpoint image.

In the first sub-frame SF1, the first projection line PL1 corresponding to the first viewing zone VZ1 is mainly overlapped with the red pixel RP displaying the red image R1 of the first viewpoint image, the green pixel GP displaying the green image G1 of the first viewpoint image, and the blue pixel BP displaying the blue image B1 of the first viewpoint image. Thus, the red image R1 of the first viewpoint image, the green image G1 of the first viewpoint image, and the blue image B1 of the first viewpoint image are projected on the first viewing zone VZ1.

Meanwhile, the dot DT displays the color images of the viewpoint images, which are not displayed in the first sub-frame SF1, during the second sub-frame SF2. In more detail, the dot DT displays three color images of the third, fourth, seventh, and eighth viewpoint images. For instance, the red pixel RP arranged in the first row and the first column of the dot DT, the blue pixel BP arranged in the first row and the third column of the dot DT, and the green pixel GP arranged in the first row and the fifth column of the dot DT respectively display the red image R3, the blue image B3, and the green image G3 of the third viewpoint image.

When the lenticular lenses 232 move along the row direction by the distance AD in the second sub-frame SF2, the second projection line PL2 corresponding to the third viewing zone VZ3 moves along the row direction by the distance AD.

Thus, during the second sub-frame SF2, the second projection line PL2 is mainly overlapped with the red, green, and blue pixels RP, GP, and BP respectively displaying the red, green, and blue images R1, G1, and B1 of the third viewpoint image, and the red, green, and blue images R3, G3 and B3 of the third viewpoint image are projected on the third viewing zone VZ3.

In the above-mentioned descriptions, only the first and third viewpoint images have been described, but red, green, and blue images of the other viewpoint images are projected on corresponding viewing zones in the first and second sub-frames SF1 and SF2 in a manner similar to the red, green, and blue images of the first and third viewpoint images.

Consequently, since the 3D image display device 1000 projects the red, green, and blue images of each of the first to eighth viewpoint images on the corresponding viewing zones in the first and second sub-frames SF1 and SF2, the viewer VU recognizes the images during the first and second sub-frames SF1 and SF2 and perceives the 3D image having the color.

Figure 13:
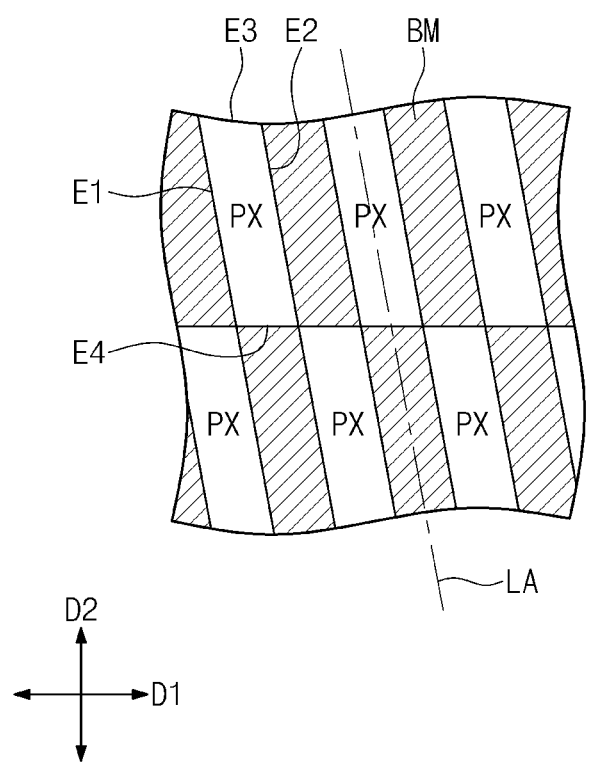
FIG. 13 is an enlarged plan view showing a display panel according to another exemplary embodiment of the present disclosure.

FIG. 13 is an enlarged plan view showing a display panel according to another exemplary embodiment of the present disclosure.

Referring to FIG. 13, each of the pixels PX includes a first edge E1 substantially parallel to the long axis LA (refer to FIG. 5) of the lenticular lenses 232 (refer to FIG. 5), a second edge E2 substantially parallel to the first edge E1, a third edge E3 substantially parallel to the row direction, i.e., the first direction D1, and a fourth edge E4 substantially parallel to the third edge E3. A black matrix BM is disposed between the pixels PX to block the light.

For example, the first edge E1 of each of the pixels PX extends from the second edge E2 of the pixel PX arranged in the row in the vicinity of each of the pixels PX.

As described above, when each of the pixels PX includes the first and second edges E1 and E2, the projection line PL projects only one corresponding pixel on the corresponding viewing zone. Thus, the crosstalk may be prevented from occurring in each viewing zone.

In addition, since the pixels PX include the third and fourth edges E3 and E4 substantially parallel to the row direction, the gate lines GL1 to GLn (refer to FIG. 2) may be arranged to be substantially parallel to the row direction.

According to the above, the three-dimensional image display device displays 3D images having colors during the first and second sub-frames. Thus, the number of viewpoints of the 3D images can be increased. In addition, because one dot includes the pixels arranged in the matrix form, non-uniform deterioration in the resolution in the row direction and the resolution in the column direction may be prevented.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A three-dimensional image display device comprising:
a display panel comprising a dot, the dot comprising a plurality of pixels and configured to display first and second color images respectively having first and second colors of a first viewpoint image among a plurality of viewpoint images during a first sub-frame, and display a third color image having a third color of the first viewpoint image during a second sub-frame; and
a viewpoint forming unit comprising a plurality of viewpoint forming devices each having a pitch less than a width in a row direction of the dot, being positioned at a first position during the first sub-frame to project the first and second color images on a viewing zone corresponding to the first viewpoint image, and being positioned at a second position during the second sub-frame to project the third color image on the viewing zone.

2. The three-dimensional image display device of claim 1, wherein the dot is configured to display a fourth color image having the third color of a second viewpoint image among the viewpoint images during the first sub-frame, and display a fifth color image having the first color of the second viewpoint image and a sixth color image having the second color of the second viewpoint image during the second sub-frame.

3. The three-dimensional image display device of claim 1, wherein:
the dot comprises first, second, and third pixels respectively displaying the first, second, and third color images; and
the first, second, and third pixels are arranged in a same row.

4. The three-dimensional image display device of claim 3, wherein the third pixel is disposed between the first pixel and the second pixel.

5. The three-dimensional image display device of claim 4, wherein:
the pixels are arranged in a matrix form of M rows by N columns;
the viewpoint forming devices comprise a long axis inclined at an angle ($\theta$) with respect to a column direction; and
the angle ($\theta$) satisfies the following Equation:

$$\tan\theta = \frac{b \cdot Wh}{a \cdot Wv},$$

where Wh denotes a width in the row direction of the pixel, Wv denotes a width in the column direction of the pixel, and "a" and "b" are natural numbers.

6. The three-dimensional image display device of claim 5, wherein the pitch (P) of each of the viewpoint forming devices satisfies the following Equation:

$$0 < P \leq 2/3 \cdot Wp,$$

where Wp denotes the width of the dot in the row direction.

7. The three-dimensional image display device of claim 6, wherein:
the second position is spaced apart from the first position by a distance (AD) in the row direction; and
the distance (AD) satisfies the following Equation:

$$AD = \frac{P}{2}.$$

8. The three-dimensional image display device of claim 7, wherein the first, second, and third pixels are spaced apart from each other by the distance AD.

9. The three-dimensional image display device of claim 8, wherein a number (kn) of the viewpoint images satisfies the following Equation:

$$Kn = 2/3 M \cdot N.$$

10. The three-dimensional image display device of claim 9, wherein M=2, N=6 or 12, "a"=2, and b=1.

11. The three-dimensional image display device of claim 9, wherein M=3, N=6, "a"=3, and "b"=1.

12. The three-dimensional image display device of claim 9, wherein M=4, N=3 or 6, a=4, and "b" is one.

13. The three-dimensional image display device of claim 9, wherein the M=4, N=12, "a"=4, and "b"=3.

14. The three-dimensional image display device of claim 5, wherein N is a multiple of three.

15. The three-dimensional image display device of claim 5, wherein N is not a multiple of nine.

16. The three-dimensional image display device of claim 5, wherein:
a ratio of the width in the row direction of the pixel and the width in the column direction of the pixel is A:B;
a ratio of M and N is A:B; and
"A" and "B" are natural numbers.

17. The three-dimensional image display device of claim 1, wherein:
the dot comprises first, second, and third pixels respectively displaying the first, second, and third color images;
two of the first, second, and third pixels is arranged in a first row; and
the other of the first, second, and third pixels are arranged in a second row disposed adjacent to the first row.

18. The three-dimensional image display device of claim 17, wherein the first and third pixels are arranged in the first row and the second pixel is arranged in the second row.

19. The three-dimensional image display device of claim 18, wherein the second pixel is arranged in a second column defined between a first column in which the first pixel is arranged and a third column in which the third pixel is arranged.

20. The three-dimensional image display device of claim 19, wherein:
the pixels are arranged in a matrix form of M rows by N columns;
the viewpoint forming devices comprise a long axis inclined at an angle (θ) with respect to a column direction; and
the angle (θ) satisfies the following Equation:

$$\tan\theta = \frac{2 \cdot Wh}{3 \cdot Wv},$$

where Wh denotes a width in the row direction of the pixel, and Wv denotes a width in the column direction of the pixel.

21. The three-dimensional image display device of claim 20, wherein the pitch (P) of each of the viewpoint forming devices satisfies the following Equation:

$$0 < P \leq 4/9 \cdot Wp,$$

where Wp denotes the width in the row direction of the dot.

22. The three-dimensional image display device of claim 21, wherein:
the second position is spaced apart from the first position by a distance (AD) in the row direction; and
the distance (AD) satisfies the following Equation:

$$AD = \frac{P}{2}.$$

23. The three-dimensional image display device of claim 22, wherein a number (kn) of the viewpoint images satisfies the following Equation:

$$Kn = 2/3 M \cdot N.$$

24. The three-dimensional image display device of claim 22, wherein M=2 and N=six.

25. The three-dimensional image display device of claim 20, wherein N is a multiple of three.

26. The three-dimensional image display device of claim 1, wherein the first, second, and third colors are red, green, and blue, respectively.

27. The three-dimensional image display device of claim 1, wherein the viewpoint forming devices comprises one of a lenticular lens and a parallax barrier.

28. The three-dimensional image display device of claim 1, wherein the viewpoint forming devices comprise a long axis inclined with respect to a column direction when viewed in a plan view, and each of the pixels comprises a first edge substantially parallel to the long axis, a second edge substantially parallel to the first edge, a third edge substantially parallel to the row direction, and a fourth edge substantially parallel to the third edge.

29. The three-dimensional image display device of claim 28, wherein the first edge of each of the pixels extends from the second edge of the pixel arranged in the row disposed adjacent to each of the pixels.

* * * * *